(12) United States Patent
Oikawa et al.

(10) Patent No.: US 7,869,119 B2
(45) Date of Patent: Jan. 11, 2011

(54) ELECTRONIC PAPER

(75) Inventors: Yoshiaki Oikawa, Tochigi (JP); Shingo Eguchi, Tochigi (JP); Mitsuo Mashiyama, Tochigi (JP); Masatoshi Kataniwa, Tochigi (JP); Hironobu Shoji, Tochigi (JP); Masataka Nakada, Tochigi (JP)

(73) Assignee: Semiconductor Energy laborator Co., Ltd. (JP)

( * ) Notice: Subject to any disclaimer, the term of this patent is extended or adjusted under 35 U.S.C. 154(b) by 0 days.

(21) Appl. No.: 12/499,175

(22) Filed: Jul. 8, 2009

(65) Prior Publication Data
US 2010/0007942 A1 Jan. 14, 2010

(30) Foreign Application Priority Data
Jul. 10, 2008 (JP) ............................. 2008-180762

(51) Int. Cl.
*G02B 26/00* (2006.01)
*G09G 3/19* (2006.01)
*G03G 13/00* (2006.01)

(52) U.S. Cl. ............................. 359/296; 345/49; 430/31
(58) Field of Classification Search ................. 359/296; 349/33; 345/49, 105, 107; 430/31–32; 204/450, 204/600; 250/70, 208.1; 438/929
See application file for complete search history.

(56) References Cited

U.S. PATENT DOCUMENTS

| | | | |
|---|---|---|---|
| 6,542,284 B2 * | 4/2003 | Ogawa ........................ 359/296 |
| 6,774,884 B2 | 8/2004 | Shimoda et al. |
| 6,885,146 B2 | 4/2005 | Yamazaki et al. |
| 7,049,178 B2 | 5/2006 | Kim et al. |
| 7,351,300 B2 | 4/2008 | Takayama et al. |
| 2008/0083954 A1 | 4/2008 | Tokunaga |
| 2008/0224940 A1 | 9/2008 | Sugiyama et al. |
| 2008/0224941 A1 | 9/2008 | Sugiyama et al. |
| 2008/0242005 A1 | 10/2008 | Dozen et al. |
| 2008/0311706 A1 | 12/2008 | Dozen et al. |
| 2009/0042356 A1 | 2/2009 | Takayama et al. |
| 2009/0314527 A1 * | 12/2009 | Hatano et al. ................ 174/255 |

FOREIGN PATENT DOCUMENTS

JP     2002-169190     6/2002

* cited by examiner

*Primary Examiner*—Scott J Sugarman
*Assistant Examiner*—Dawayne A Pinkney
(74) *Attorney, Agent, or Firm*—Husch Blackwell LLP; Welsh Katz

(57) ABSTRACT

An object of the present invention is to increase the resistance of electronic paper to external stress. The resistance to external stress is increased by providing an element formation layer, which includes an integrated circuit portion, a first electrode, a second electrode, and a charged particle-containing layer, between a first insulating film including a first structure body in which a first fibrous body is impregnated with a first organic resin, and a second insulating film including a second structure body in which a second fibrous body is impregnated with a second organic resin.

28 Claims, 24 Drawing Sheets

132a  132b     191  195

ELECTRONIC PAPER

BACKGROUND OF THE INVENTION

1. Field of the Invention

The present invention relates to electronic paper and a method for manufacturing the same, and particularly relates to flexible electronic paper and a method for manufacturing the same.

2. Description of the Related Art

In recent years, display devices such as liquid crystal display devices and EL display devices have been extensively researched, and as one of the display devices capable of operating with low power consumption, electronic paper has attracted attention. The electronic paper has the advantage that it consumes less power and it can hold images even after being turned off, therefore, it has been expected to be applied to e-book readers or posters.

Various kinds of electronic paper using various methods have been proposed. Like liquid crystal display devices and the like, active matrix electronic paper using a transistor as a switching element of a pixel has been proposed (for example, see Patent Document 1).

[Patent Document]

[Patent Document 1] Japanese Published Patent Application No. 2002-169190

When electronic paper is used as an e-book reader, it is frequently touched with hands. Accordingly, elements included in the electronic paper, such as transistors, need to have mechanical strength and resistance to static electricity. When electronic paper is attached to a roof or a window of a building to be used as a poster or the like, the electronic paper needs to have high weather resistance, durability, and the like. Thus, in order to obtain highly reliable electronic paper, it is necessary to increase the resistance of the electronic paper to externally applied force (hereinafter, also referred to as external stress).

One object of an embodiment of the present invention is to increase the resistance of electronic paper to external stress.

SUMMARY OF THE INVENTION

According to one embodiment of the present invention, an element formation layer is provided between a first insulating film including a first structure body in which a first fibrous body is impregnated with a first organic resin, and a second insulating film including a second structure body in which a second fibrous body is impregnated with a second organic resin, whereby the resistance to external stress can be increased. Note that the external stress includes all the kinds of stress that may adversely affect electronic paper, such as modification such as bending, mechanical stress such as locally applied pressure (pressing force), electrical stress such as static electricity, physical stress such as wind, rain, or dust.

One embodiment of the present invention includes a first insulating film and a second insulating film facing each other, and an element formation layer provided between the first insulating film and the second insulating film. The element formation layer includes an integrated circuit portion, a first electrode electrically connected to the integrated circuit portion, a second electrode facing the first electrode, and a charged particle-containing layer provided between the first electrode and the second electrode. The first insulating film includes a first structure body in which a first fibrous body is impregnated with a first organic resin, and the second insulating film includes a second structure body in which a second fibrous body is impregnated with a second organic resin. The first organic resin and the second organic resin are bonded to each other at the edges of the first insulating film and the second insulating film.

One embodiment of the present invention includes a first insulating film and a second insulating film facing each other, and an element formation layer provided between the first insulating film and the second insulating film. The element formation layer includes an integrated circuit portion, a first electrode electrically connected to the integrated circuit portion, a second electrode facing the first electrode, and a charged particle-containing layer provided between the first electrode and the second electrode. The first insulating film includes a first structure body in which a first fibrous body is impregnated with a first organic resin, and a first protective film having a modulus of elasticity lower than that of the first structure body. The second insulating film includes a second structure body in which a second fibrous body is impregnated with a second organic resin, and a second protective film having a modulus of elasticity lower than that of the second structure body. The first organic resin and the second organic resin are bonded to each other at the edges of the first insulating film and the second insulating film.

According to one embodiment of the present invention, an element formation layer is provided between a first insulating film having a first structure body in which a first fibrous body is impregnated with a first organic resin, and a second insulating film having a second structure body in which a second fibrous body is impregnated with a second organic resin, whereby the resistance of electronic paper to external stress can be increased.

DETAILED DESCRIPTION OF THE INVENTION

Figure 1A:
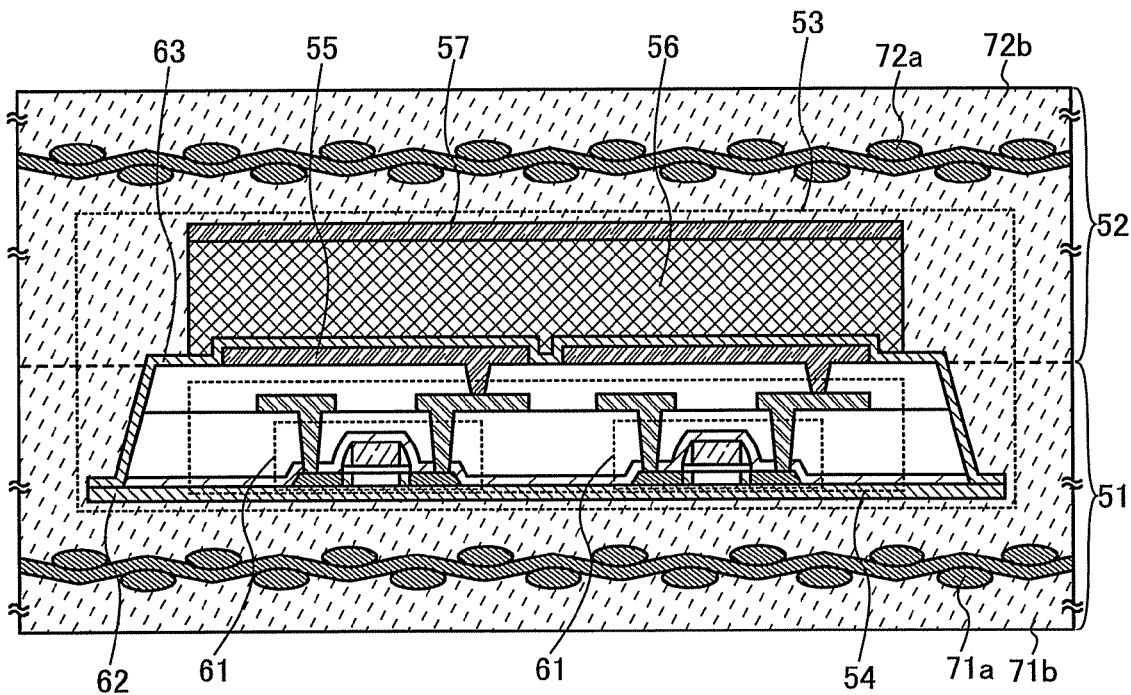
FIGS. 1A and 1B are diagrams each illustrating an example of electronic paper.

Embodiments of the present invention will be described in detail with reference to drawings. Note that the present invention is not limited to the description below, and it is apparent to those skilled in the art that modes and details can be modified in various ways without departing from the spirit and scope of the present invention. Accordingly, the present invention should not be construed as being limited to the description of the embodiments given below. Note that in the structures of the present invention described below, like portions or portions having a similar function are denoted by like reference numerals, and the description thereof is omitted.

Embodiment 1

In this embodiment, an example of electronic paper will be described with reference to drawings.

Electronic paper shown in this embodiment includes a first insulating film 51 and a second insulating film 52 facing each other, and an element formation layer 53 provided between the first insulating film 51 and the second insulating film 52. The first insulating film 51 includes a first structure body in which a fibrous body 71a is impregnated with a first organic resin 71b, and the second insulating film 52 includes a second structure body in which a fibrous body 72a is impregnated with a second organic resin 72b. In a region where the element formation layer 53 is not provided (for example, at the edges of the first insulating film 51 and the second insulating film 52), the first organic resin 71b is bonded to the second organic resin 72b (see FIG. 1A).

Figure 1B:
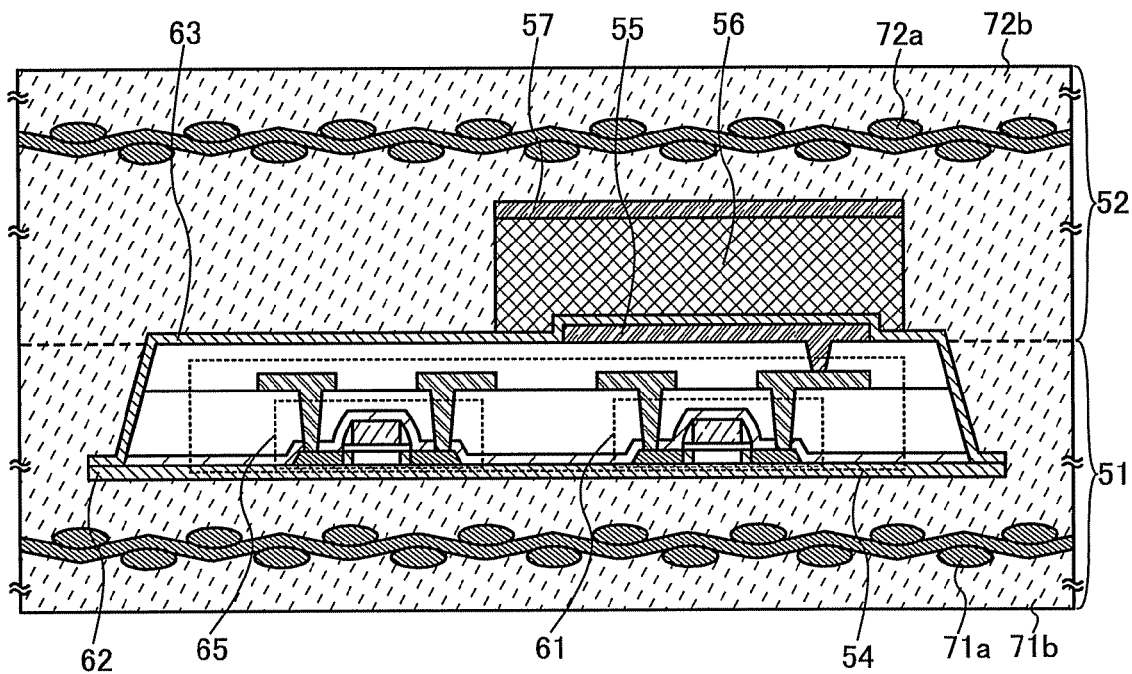

FIGS. 1A and 1B show the case where the first insulating film 51 includes only the first structure body (the first structure body corresponds to the first insulating film 51); however, the first insulating film 51 may also include another insulating layer stacked on the first structure body. The same applies to the second insulating film 52. The first insulating film 51 and the second insulating film 52 are made of a flexible insulating material.

The element formation layer 53 includes: an integrated circuit portion 54 having elements such as transistors and capacitors; first electrodes 55 electrically connected to the elements of the integrated circuit portion 54; a second electrode 57 facing the first electrodes 55; and a charged particle-containing layer 56 provided between the first electrodes 55 and the second electrode 57.

FIG. 1A illustrates an active matrix structure in which the integrated circuit portion 54 includes transistors 61 and the transistors 61 are electrically connected to the first electrodes 55. It is needless to say that the structure of the electronic paper shown in this embodiment is not limited to this structure, and a transistor 65 constituting a scan line driver circuit, a signal line driver circuit, or a memory circuit may be provided in the same process as the transistors 61 constituting the pixels (see FIG. 1B).

The integrated circuit portion 54 may include an antenna so that data can be wirelessly communicated with the outside. In that case, data such as images to be displayed can be received from the outside through the antenna provided in the integrated circuit portion 54.

Note that there is no particular limitation on the structure of the transistors in FIGS. 1A and 1B, and it is possible to use a variety of structures such as a single-drain structure, an LDD (lightly-doped drain) structure, or a gate-overlap drain structure. Here, a thin film transistor using a crystalline semiconductor is shown which has an LDD structure in which low-concentration impurity regions are provided using insulating layers (also referred to as sidewalls) touching the sides of a gate electrode; however, the present invention is not limited to such a transistor. For example, a thin film transistor using an amorphous semiconductor or an organic transistor may also be used.

As another structure of the transistors, it is also possible to use a multigate structure in which transistors having substantially the same gate voltage are connected in series, a dual gate structure in which a semiconductor layer is interposed between gate electrodes, or the like. Alternatively, a diode, an MIM (metal-insulator-metal), MEMS (micro electro mechanical systems), or the like can be used instead of the transistors if it serves as a switching element of a pixel of electronic paper.

The charged particle-containing layer 56 contains charged particles. The charged particles move under the influence of an electric field applied between the first electrodes 55 and the second electrode 57, whereby images can be displayed. The material of the charged particle-containing layer 56 may be selected as appropriate depending on the system used for electronic paper (the microcapsule electrophoresis system, the horizontal type electrophoresis system, the vertical electrophoresis system, a system using a twisting ball, a system using a charged toner, a system using Electronic Liquid Powder (trademark), or the like).

For example, as the charged particle-containing layer 56, it is possible to use a microcapsule containing positively-charged particles of one color and negatively-charged particles of another color.

As the fibrous bodies 71a and 72a provided over and under the element formation layer 53, high-strength fibers of an organic compound or an inorganic compound can be used. As typical examples of the high-strength fibers, there are a polyvinyl alcohol fiber, a polyester fiber, a polyamide fiber, a polyethylene fiber, an aramid fiber, a polyparaphenylene benzobisoxazole fiber, a glass fiber, a carbon fiber, and the like. As the glass fiber, a glass fiber using E glass, S glass, D glass, Q glass, or the like can be used. Note that the fibrous bodies 71a and 72a may be formed of one kind of the above high-strength fibers or plural kinds of the above high-strength fibers. The fibrous body is not necessarily provided over and under the element formation layer 53, and may be provided either over or under the element formation layer 53.

The fibrous bodies 71a and 72a may be a woven fabric that is woven from bundles of fibers (single yarns) (hereinafter referred to as bundles of yarns) used for warp yarns and weft yarns, or a nonwoven fabric obtained by stacking bundles of plural kinds of fibers randomly or regularly. In the case of a woven fabric, a plain-woven fabric, a twilled fabric, a satin-woven fabric, or the like can be used as appropriate.

The bundle of yarns may have a circular shape or an elliptical shape in cross section. The bundle of fiber yarns may be subjected to fiber opening with a high-pressure water stream, high-frequency vibration using liquid as a medium, continuous ultrasonic vibration, pressing with a roller, or the like. The bundle of fiber yarns, which has been subjected to fiber opening, has a large width and has an elliptical shape or a flat shape in cross section, which allows the number of single yarns in the thickness direction to be reduced. Furthermore, with the use of a loosely twisted yarn as the bundle of fiber yarns, the bundle of yarns is easily flattened and has an elliptical shape or a flat shape in cross section. By using such a bundle of yarns having an elliptical shape or a flat shape in cross section, the thickness of each of the fibrous bodies 71a and 72a can be reduced, and thin electronic paper can be manufactured.

The diameter of the bundle of fiber yarns is 4 μm to 400 μm, and preferably 4 μm to 200 μm.

Figure 4A:
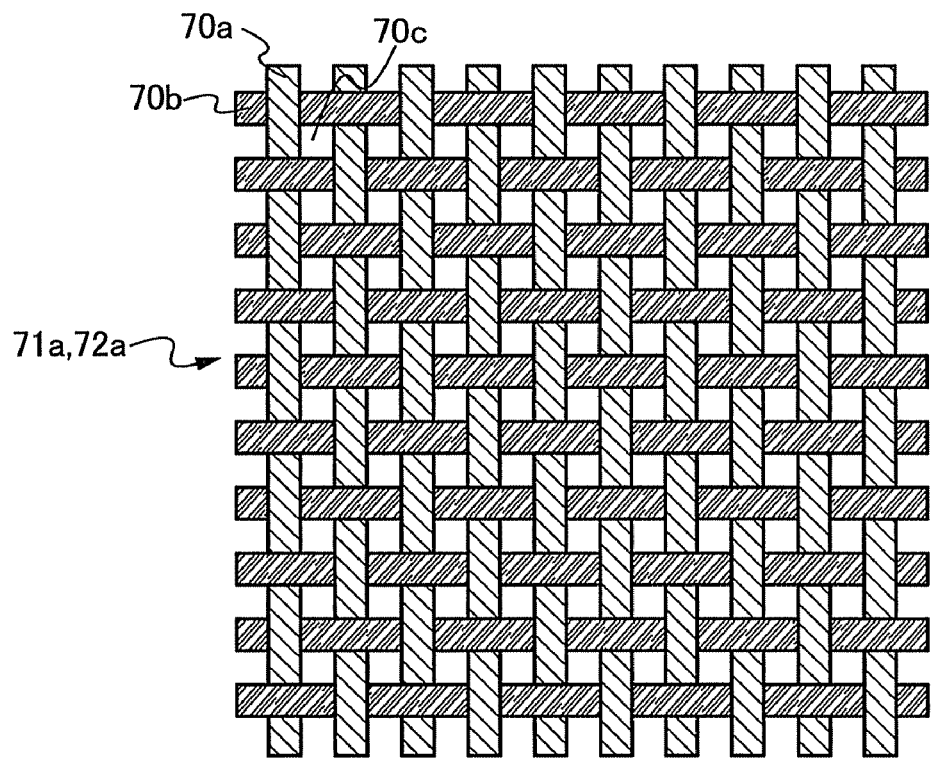
FIGS. 4A and 4B are diagrams each illustrating an example of a method for manufacturing electronic paper.
Figure 4B:
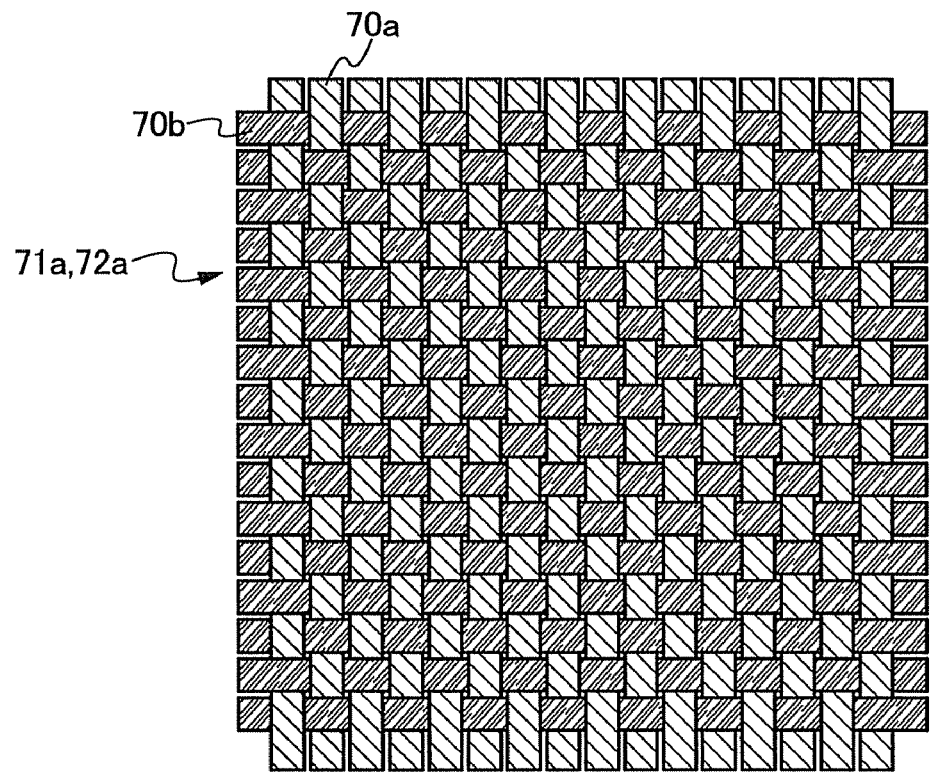

FIGS. 4A and 4B are top views of a woven fabric that is woven from bundles of fiber yarns used for warp yarns and weft yarns, which is used as the fibrous bodies 71a and 72a.

In FIG. 4A, each of the fibrous bodies 71a and 72a is woven from regularly-spaced warp yarns 70a and regularly-spaced weft yarns 70b. Such a fibrous body has regions (referred to as basket holes 70c) where neither the warp yarns 70a nor the weft yarns 70b exist. These regions are impregnated with an organic resin.

As illustrated in FIG. 4B, each of the fibrous bodies 71a and 72a may have a high density of the warp yarns 70a and the weft yarns 70b and the proportion of the basket holes 70c may be low. Typically, the size of each of the basket holes 70c is preferably smaller than that of the area locally pressed. Typically, it is preferable that each of the basket holes 70c have a rectangular shape with a side length of 0.01 mm to 0.2 mm. If each of the basket holes 70c of the fibrous bodies 71a and 72a has such a small area, even when pressure is applied by a member with a sharp tip (typically, a writing instrument such as a pen or a pencil), the pressure can be absorbed by the entire fibrous bodies 71a and 72a.

Figure 23A:
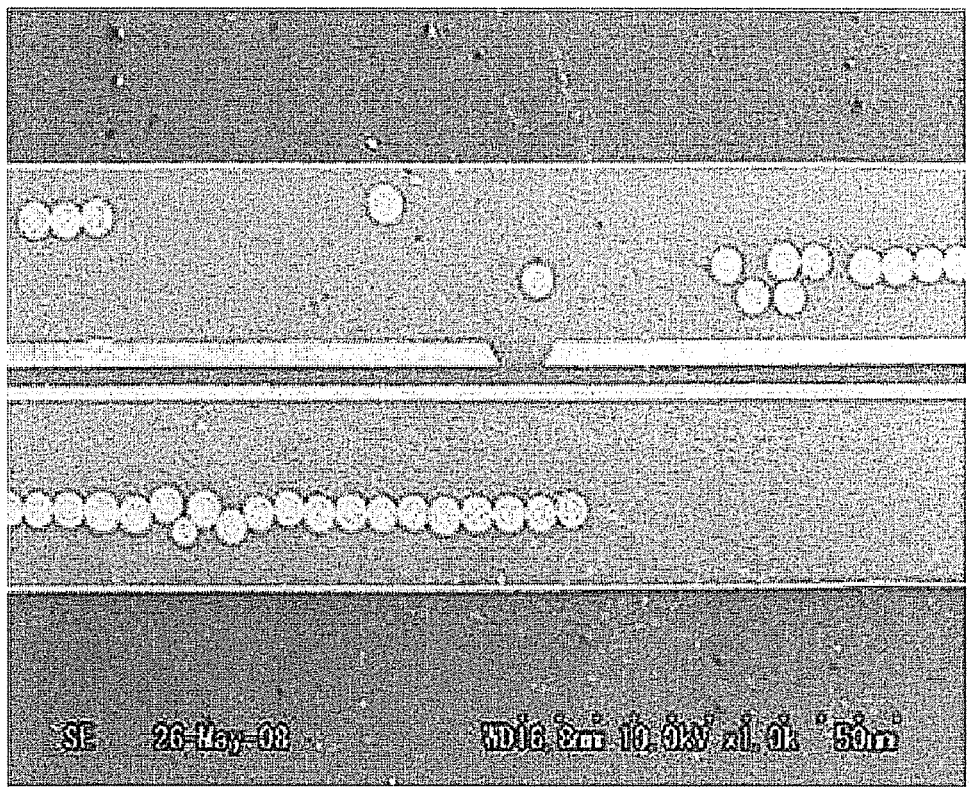
FIGS. 23A and 23B are views illustrating an example of a structure body in which a fibrous body is impregnated with an organic resin.
Figure 23B:
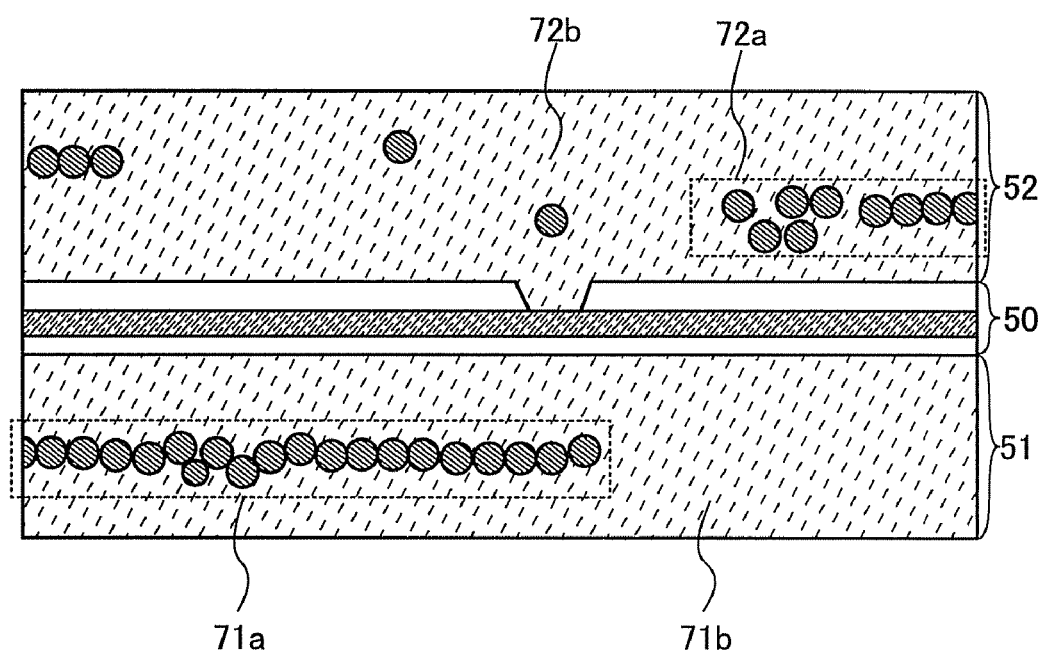
Figure 24:
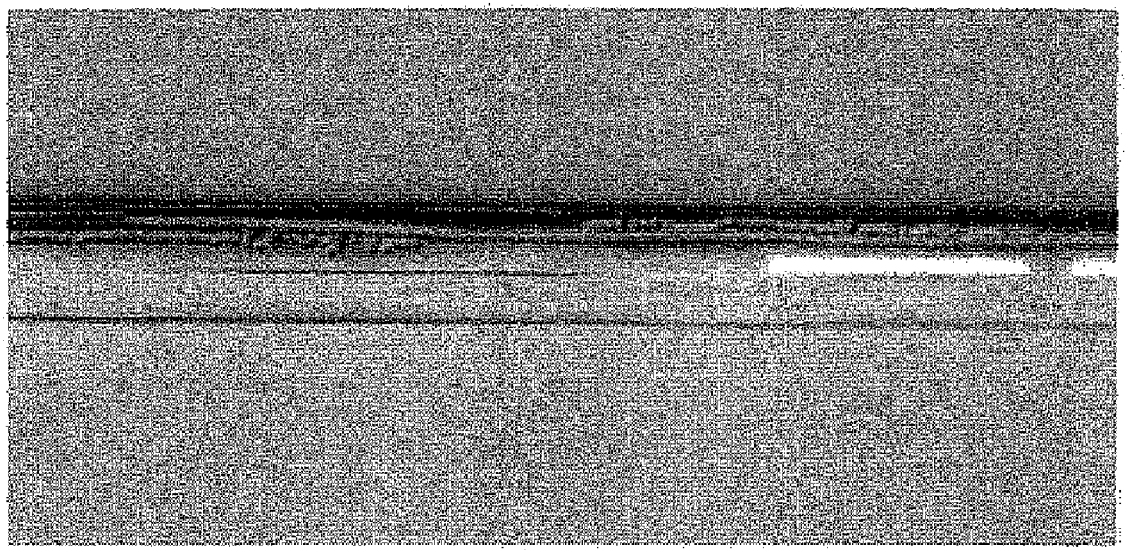
FIG. 24 is a view illustrating an example of a structure body in which a fibrous body is impregnated with an organic resin.

FIGS. 23A and 23B and FIG. 24 illustrate an example in which a fibrous body is impregnated with an organic resin. Note that FIG. 23A is a SEM image (magnified 1000 times) of a cross-section of a sample actually manufactured, and FIG. 23B is a schematic view of FIG. 23A. FIG. 24 shows an image (magnified 20 times) of the cross-section of the sample actually manufactured, which was observed by an optical microscope.

FIGS. 23A and 23B shows the case in which the first structure body 51 in which the fibrous body 71a is impregnated with the organic resin 71b and the second structure body 52 in which the fibrous body 72a is impregnated with the organic resin 72b are provided with a transistor portion 50 interposed therebetween. Although the cross-sectional views of FIGS. 23A and 23B show only one of the warp yarns and the weft yarns as the fibrous body 71a and the fibrous body 72a, the other fibrous body intersecting the one of the warp yarns and the weft yarns exists depending on the direction of the cross-section observed.

The cross-sectional view of FIG. 24 shows that warp yarns and weft yarns each including a bundle of fibers intersect each other.

As described above, the fibrous bodies are woven into fabric form so that the warp yarns and the weft yarns cross each other, and the woven fabric is impregnated with an organic resin. Accordingly, expansion and contraction of the woven fabric in the direction of the surface of the fabric can be suppressed by the fibrous bodies, and flexibility in the direction perpendicular to the surface direction can be obtained.

As illustrated in FIGS. 4A and 4B, the fibrous bodies are woven into fabric form so that the warp yarns and the weft yarns cross each other, and the woven fabric is impregnated with an organic resin. Accordingly, expansion and contraction of the woven fabric in the direction of the surface of the fabric can be suppressed by the fibrous bodies, and flexibility in the direction perpendicular to the surface direction can be obtained.

In order to enhance the permeability of an organic resin in the bundles of fiber yarns, the fibers may be subjected to surface treatment. For example, corona discharge or plasma discharge may be performed to activate the surface of the fibers. Alternatively, surface treatment may be performed using a silane coupling agent or a titanate coupling agent.

The first organic resin 71b and the second organic resin 72b, with which the fibrous bodies 71a and 72a are impregnated, respectively, and the element formation layer 53 is sealed, can be made of a thermosetting resin such as an epoxy resin, an unsaturated polyester resin, a polyimide resin, a bismaleimide-triazine resin, or a cyanate resin. Alternatively, a thermoplastic resin such as a polyphenylene oxide resin, a polyetherimide resin, or a fluorine resin may be used. Further, plural kinds of the aforementioned thermosetting resins and thermoplastic resins may also be used as the organic resins 71b and 72b. By using the aforementioned organic resins, the fibrous bodies 71a and 72a can be firmly bonded to the element formation layer by heat treatment. Note that the higher the glass transition temperature of the first organic resin 71b and the second organic resin 72b is, the less the organic resins are damaged by locally applied force, which is preferable.

The thickness of each of the first structure body and the second structure body is preferably 10 μm to 100 μm, and more preferably 10 μm to 30 μm. By using the structure body with such a thickness, thin electronic paper that can be bent can be manufactured.

Highly thermally-conductive filler may be dispersed in the first organic resin 71b and the second organic resin 72b, or the bundles of fiber yarns. As the highly thermally-conductive filler, aluminum nitride, boron nitride, silicon nitride, or alumina can be used. Alternatively, metal particles such as silver or copper particles may be used. When the highly thermally-conductive filler is included in the organic resins or the bundles of fiber yarns, heat generated in the element formation layer 53 can be easily released to the outside. Accordingly, thermal storage in the element formation layer 53 can be suppressed and thus damage to the electronic paper and display defects can be reduced.

The effect of the electronic paper shown in this embodiment will be described with reference to FIGS. 5A to 5D.

Figure 5A:
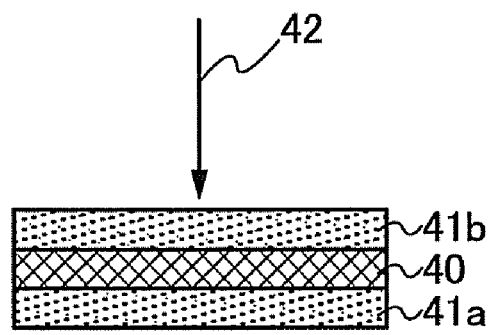
FIGS. 5A to 5D are diagrams illustrating an example of a method for manufacturing electronic paper.
Figure 5B:
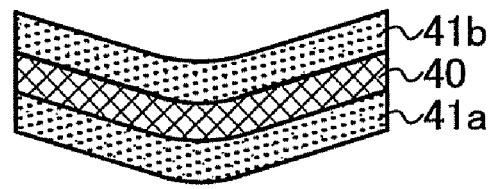

As illustrated in FIG. 5A, conventional electronic paper has a structure in which an element formation layer 40 is sealed with insulating films 41a and 41b. When external stress (pressure 42) is locally applied to such electronic paper, the element formation layer 40 and the insulating films 41a and 41b each stretch as illustrated in FIG. 5B, the pressed portion is curved with a small radius of curvature. As a result, semiconductor elements, wirings, and the like constituting the element formation layer 40 are cracked and the electronic paper is broken.

Figure 5C:
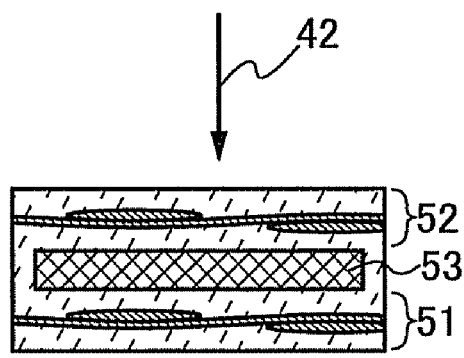
Figure 5D:
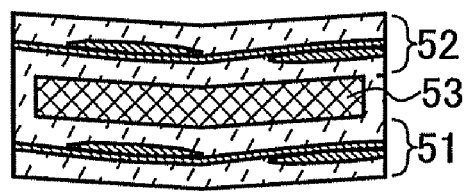

However, in the electronic paper shown in this embodiment, a fibrous body having a high tensile modulus of elasticity or a high Young's modulus is firmly bonded over and under the element formation layer 53 with an organic resin as illustrated in FIG. 5C. Therefore, even when the pressure 42 such as point pressure or linear pressure is locally applied as illustrated in FIG. 5D, high-strength fibers do not stretch and the pressure is dispersed throughout the fibers, so that the entire electronic paper is curved. Thus, even when pressure is locally applied, the electronic paper is curved with a large radius of curvature; therefore, semiconductor elements, wirings, and the like constituting the element formation layer 53 are not cracked and damage to the electronic paper can be reduced.

In addition, when the first organic resin 71b and the second organic resin 72b are directly bonded to each other as shown in this embodiment, the adhesion between the first insulating film 51 and the second insulating film 52 can be improved, moisture or the like can be prevented from entering from the bonding surface, and the separation of the first insulating film 51 and the second insulating film 52 can be suppressed.

It is preferable that the element formation layer 53 be placed in the middle of the first insulating film 51 and the second insulating film 52 (i.e., the first insulating film 51 and the second insulating film 52 have substantially the same thickness). In that case, the first insulating film 51 (the first structure body) and the second insulating film 52 (the second structure body) are symmetrically disposed with respect to the element formation layer 53. Accordingly, the force applied to the element formation layer 53 when the electronic paper is curved or the like can be evenly dispersed, and damage to the element formation layer 53 due to bending or warping of the electronic paper can be reduced.

Furthermore, in the electronic paper shown in this embodiment, a barrier layer is preferably provided between the element formation layer 53 and the first insulating film 51, and between the element formation layer 53 and the second insulating film 52. For example, as illustrated in FIGS. 1A and 1B, a first barrier layer 62 and a second barrier layer 63 can be provided to cover the integrated circuit portion 54.

Here, the integrated circuit portion 54 is provided over the first barrier layer 62, the second barrier layer 63 is provided to cover the first electrode 55, and the first barrier layer 62 and the second barrier layer 63 touch each other at their edges, whereby the integrated circuit portion 54 is surrounded by the barrier layers. With such a structure, impurities such as moisture or alkali metal can be prevented from entering and degradation of elements such as transistors included in the integrated circuit portion 54 can be reduced. This structure is particularly effective in the case where an organic material is used for the elements of the integrated circuit portion 54 (in the case where organic transistors are provided in the integrated circuit portion 54).

Note that the first barrier layer 62 and the second barrier layer 63 may be provided to surround the entire element formation layer 53. In that case, the second barrier layer 63 may be provided over the second electrode 57.

As the barrier layers 62 and 63, a nitrogen-containing layer (silicon nitride, silicon nitride oxide, silicon oxynitride, or the like) can be used.

This embodiment can be implemented in appropriate combination with the structures or manufacturing methods shown in the other embodiments of this specification.

Embodiment 2

In this embodiment, an example of a method for manufacturing the electronic paper shown in Embodiment 1 will be described with reference to drawings.

Figure 6A:
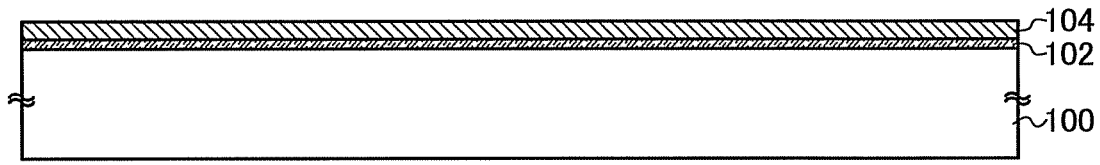
FIGS. 6A to 6E are diagrams illustrating an example of a method for manufacturing electronic paper.

First, a separation layer 102 is formed on a surface of a substrate 100, and then, an insulating layer 104 is formed (see FIG. 6A). The separation layer 102 and the insulating layer 104 can be formed continuously, which prevents impurities from entering because the substrate 100 is not exposed to the atmosphere.

As the substrate 100, a glass substrate, a quartz substrate, a metal substrate, a stainless steel substrate, or the like can be used. For example, by using a rectangular glass substrate with a side of one meter or more, productivity can be significantly increased.

Note that the separation layer 102 is formed on the entire surface of the substrate 100 in this process; however, after the separation layer 102 is formed on the entire surface of the substrate 100, the separation layer 102 may be selectively removed so that the separation layer can be provided only in a desired region. In addition, although the separation layer 102 is formed in contact with the substrate 100, an insulating layer such as a silicon oxide film, a silicon oxynitride film, a silicon nitride film, or a silicon nitride oxide film may be formed in contact with the substrate 100 as needed, and the separation layer 102 may be formed in contact with the insulating layer.

The separation layer 102 has a single-layer structure or a multi-layer structure of a film made of a material such as tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), or silicon (Si). Alternatively, the separation layer 102 may be made of an alloy containing such an element as its main component, or a compound containing such an element as its main component. Those materials can be formed by sputtering, plasma CVD, coating, printing, or the like to a thickness of 30 nm to 200 nm. Note that the coating is a deposition method in which a solution is discharged on an object, and includes, for example, spin coating or droplet discharging. The droplet discharging is a method in which a droplet of a composition containing fine particles is discharged from a small hole to form a predetermined pattern.

In the case where the separation layer 102 has a single-layer structure, it is preferable to form a tungsten layer, a molybdenum layer, or a layer containing a mixture of tungsten and molybdenum. Alternatively, a layer containing oxide or oxynitride of tungsten, a layer containing oxide or oxynitride of molybdenum, or a layer containing oxide or oxynitride of a mixture of tungsten and molybdenum may be used. Note that the mixture of tungsten and molybdenum corresponds to, for example, an alloy of tungsten and molybdenum.

In the case where the separation layer 102 has a multi-layer structure, it is preferable that a metal layer be formed as a first layer and a metal oxide layer be formed as a second layer. Typically, the first metal layer is made of tungsten or a mixture of tungsten and molybdenum, and the second layer is made of oxide of tungsten, oxide of a mixture of tungsten and molybdenum, nitride of tungsten, or nitride of a mixture of tungsten and molybdenum.

In the case where the separation layer 102 has a multi-layer structure in which a metal layer is formed as a first layer and a metal oxide layer is formed as a second layer, the separation layer 102 may be formed in the following manner: a layer containing tungsten is formed as the metal layer and an insulating layer made of oxide is formed thereover, whereby a layer containing oxide of tungsten is formed as the metal oxide layer at the interface between the tungsten layer and the insulating layer. Alternatively, the metal oxide layer may be formed by performing thermal oxidation treatment, oxygen plasma treatment, treatment with a highly oxidizing solution such as ozone water, or the like on the surface of the metal layer.

The insulating layer 104, which serves as a buffer layer, is provided so that the separation layer 102 is easily separated in a subsequent separation step. In addition, the insulating layer 104 can prevent semiconductor elements or wirings from being cracked or damaged in the subsequent separation step. The insulating layer 104 has a single-layer structure or a multi-layer structure, and is formed by, for example, sputtering, plasma CVD, coating, or printing using an inorganic compound. As typical examples of the inorganic compound, there are silicon oxide, silicon nitride, silicon oxynitride, and silicon nitride oxide.

By using a nitrogen-containing layer (such as silicon nitride, silicon nitride oxide, or silicon oxynitride) as the insulating layer 104, moisture, impurities, or gas such as oxygen can be prevented from externally entering the elements that are formed later. That is, the insulating layer 104 serves as a barrier layer. The insulating layer 104 is preferably formed to a thickness of 10 nm to 1000 nm, and more preferably a thickness of 100 nm to 700 nm.

Figure 6B:
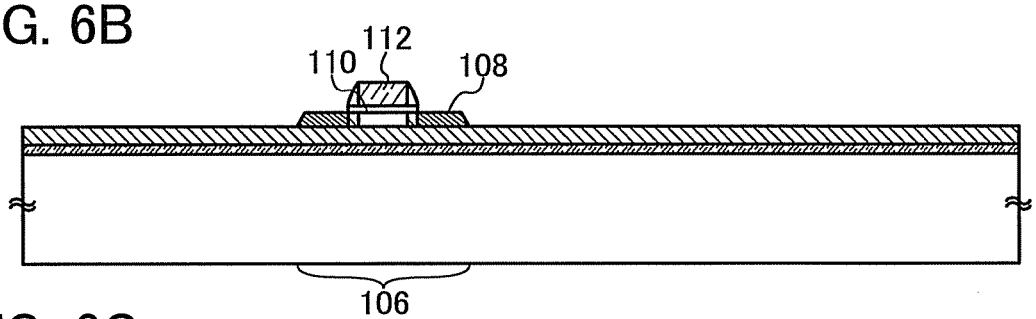

Then, a thin film transistor 106 is formed over the insulating layer 104 (see FIG. 6B). The thin film transistor 106 includes a semiconductor layer 108 having at least a source region, a drain region, and a channel formation region, a gate insulating layer 110, and a gate electrode 112.

The semiconductor layer 108 is a non-single-crystal semiconductor layer having a thickness of 10 nm to 100 nm, and preferably a thickness of 20 nm to 70 nm. As the non-single-crystal semiconductor layer, a crystalline semiconductor layer, an amorphous semiconductor layer, a microcrystalline semiconductor layer, or the like can be used. As the semiconductor, silicon, germanium, a silicon—germanium compound, or the like can be used. It is particularly preferable to use a crystalline semiconductor that is crystallized by laser light irradiation, heat treatment using rapid thermal annealing (RTA) or an annealing furnace, or a combination of these methods. As the heat treatment, it is possible to use a crystallization method using a metal element such as nickel, which promotes crystallization of silicon semiconductor.

The gate insulating layer 110 is made of an inorganic insulator such as silicon oxide or silicon oxynitride to a thickness of 5 nm to 200 nm, and preferably 10 nm to 100 nm.

The gate electrode 112 can be made of a metal or a polycrystalline semiconductor doped with an impurity imparting one conductivity type. When a metal is used, tungsten (W), molybdenum (Mo), titanium (Ti), tantalum (Ta), aluminum (Al), or the like can be used. Alternatively, metal nitride obtained by nitriding a metal can be used. Further alternatively, a first layer made of the metal nitride and a second layer made of the metal may be stacked as the gate electrode 112. In that case, the first layer made of the metal nitride can serve as a barrier metal. That is, the first layer can prevent the metal of the second layer from diffusing into the gate insulating layer and the semiconductor layer under the gate insulating layer. In the case where the multi-layer structure is used, the edge of the first layer may extend beyond the edge of the second layer.

The thin film transistor 106 may have a variety of structures such as a single-drain structure, an LDD (lightly-doped drain) structure, or a gate-overlap drain structure. The thin film transistor 106 shown here is a thin film transistor having an LDD structure in which low-concentration impurity regions are provided using insulating layers (also referred to as sidewalls) touching the sides of the gate electrode 112. Alternatively, it is possible to use a thin film transistor having a multigate structure in which transistors having substantially the same gate voltage are connected in series, a dual gate structure in which a semiconductor layer is interposed between gate electrodes, or the like.

Further, a thin film transistor using metal oxide or an organic semiconductor material for a semiconductor layer may be used as the thin film transistor 106. As typical examples of the metal oxide, there are zinc oxide and zinc—gallium—indium oxide.

Figure 6C:
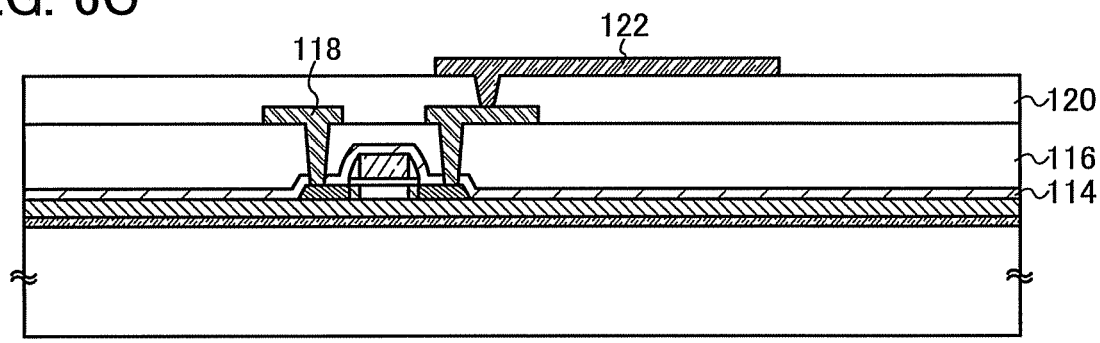

Next, wirings 118 electrically connected to the source and drain of the thin film transistor 106 are formed, and a first electrode 122 electrically connected to one of the wirings 118 is formed (see FIG. 6C). The first electrode 122 functions as a pixel electrode.

Here, insulating layers 114 and 116 are formed to cover the thin film transistor 106, and the wirings 118 capable of functioning as the source and drain electrodes are formed over the insulating layer 116. Then, an insulating layer 120 is formed over the wirings 118, and the first electrode 122 functioning as the pixel electrode is formed over the insulating layer 120.

The insulating layers 114 and 116 serve as an interlayer insulating layer. Each of the insulating layers 114 and 116 has a single-layer structure or a multi-layer structure, and is made of an inorganic material such as oxide of silicon or nitride of silicon, an organic material such as polyimide, polyamide, benzocyclobutene, acrylic, or epoxy, a siloxane material, or the like. Those materials can be formed by CVD, sputtering, SOG, droplet discharging, screen printing, or the like. Here, a silicon nitride oxide film can be formed as the first insulating layer 114, and a silicon oxynitride film can be formed as the second insulating layer 116.

The wirings 118 are preferably formed by a combination of a low-resistance material such as aluminum (Al) and a barrier metal using a high melting-point material such as titanium (Ti) or molybdenum (Mo). For example, the wirings 118 each have a multi-layer structure of titanium (Ti) and aluminum (Al) or a multi-layer structure of molybdenum (Mo) and aluminum (Al).

The insulating layer 120 has a single-layer structure or a multi-layer structure, and is made of an inorganic material such as oxide of silicon or nitride of silicon, an organic material such as polyimide, polyamide, benzocyclobutene, acrylic, or epoxy, a siloxane material, or the like. Those materials can be formed by CVD, sputtering, SOG, droplet discharging, screen printing, or the like. Here, the insulating layer 120 is formed of an epoxy resin by screen printing.

The first electrode 122 can be made of indium tin oxide (ITO) in which tin oxide is mixed with indium oxide, indium tin silicon oxide (ITSO) in which silicon oxide is mixed with indium tin oxide (ITO), indium zinc oxide (IZO) in which zinc oxide is mixed with indium oxide, zinc oxide (ZnO), tin oxide ($SnO_2$), or the like. Alternatively, the first electrode 122 may be made of a reflective metal (for example, a material film containing aluminum or silver as its main component, or a multi-layer film of such a material film).

Figure 6D:
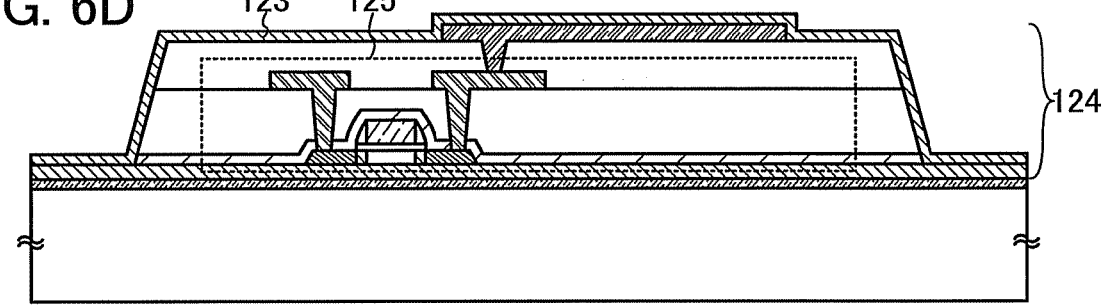

Next, the insulating layers on the edge of the substrate 100 are removed by etching or the like, and then, an insulating layer 123 is formed (see FIG. 6D). Here, at least the insulating layers 114, 116, and 120 are removed to expose the insulating layer 104. In the case where a plurality of panels are formed over one substrate, the insulating layers are etched on the edge of each region in which each panel is formed, and are divided into separate elements constituting each panel.

The insulating layer 123 serves as a barrier layer, and is preferably formed to cover at least an integrated circuit portion 125 including the thin film transistor 106. Here, the integrated circuit portion 125 and the first electrode 122 are surrounded by the insulating layer 104 and the insulating layer 123 serving as barrier layers.

As the insulating layer 123, a nitrogen-containing layer (silicon nitride, silicon nitride oxide, silicon oxynitride, or the like) can be used.

Figure 6E:
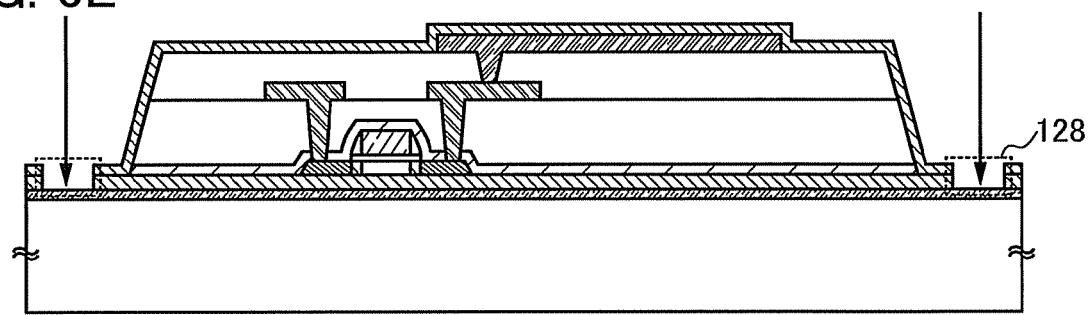

In order that a layer (hereinafter referred to as an element layer 124) including elements such as the first electrode 122 and the integrated circuit portion 125 having the thin film transistor 106 and the like is easily separated from the substrate 100, a groove is preferably formed by laser light irradiation before the element layer 124 is separated from the substrate 100. Here, a groove 128 is formed by irradiating the insulating layer 104 exposed on the edge of the substrate with laser light (see FIG. 6E).

Figure 7A:
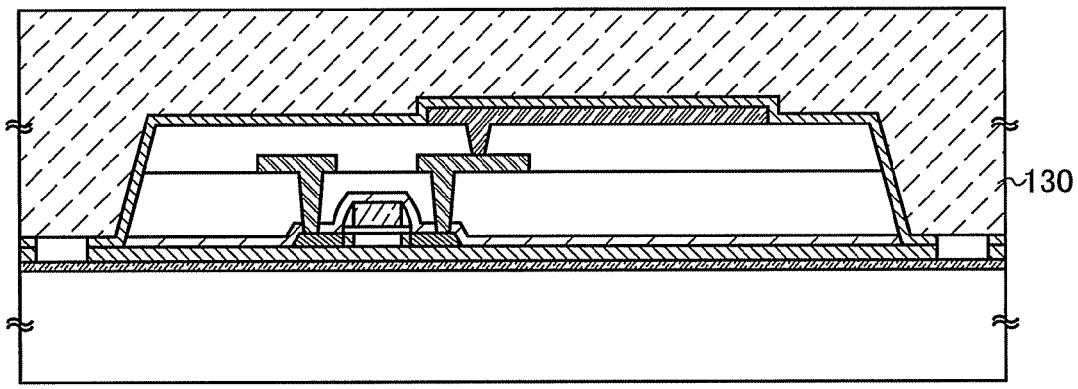
FIGS. 7A to 7C are diagrams illustrating an example of a method for manufacturing electronic paper.

Next, as illustrated in FIG. 7A, an adhesive sheet 130 is bonded to the element layer 124. As the adhesive sheet 130, a sheet that can be separated by light or heat is used.

The adhesive sheet 130 facilitates the separation, and further reduces the stress applied to the element layer 124 before and after the separation and suppresses damage to the elements included in the integrated circuit portion 125, which results in improved yield.

Figure 7B:
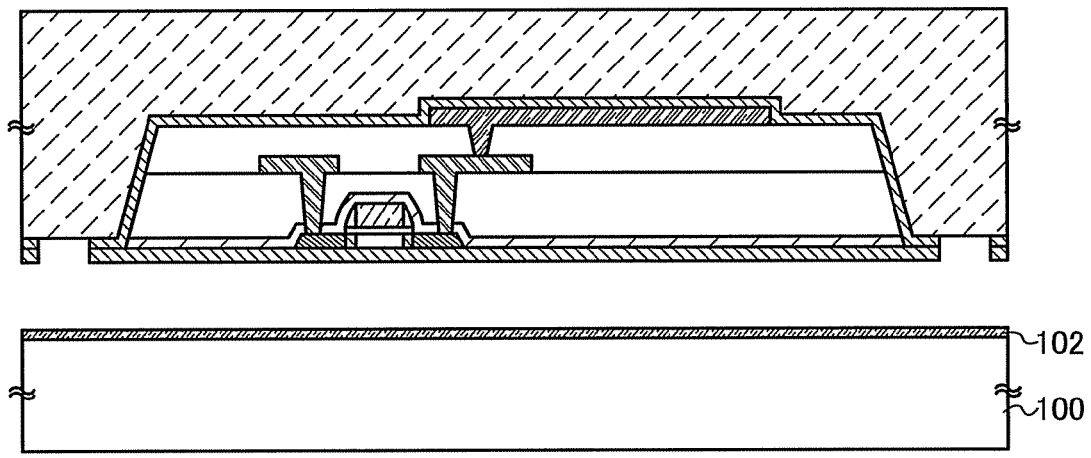

Next, the element layer 124 is separated from the substrate 100 at the interface between the separation layer 102 and the insulating layer 104 serving as a buffer layer (see FIG. 7B). The separation starts from the groove 128. The separation may be performed by, for example, applying mechanical force (pulling by hand or a gripping tool, separating while rotating a roller, or the like).

Alternatively, a liquid may be dropped into the groove 128 to be infiltrated into the interface between the separation layer 102 and the insulating layer 104, so that the element layer 124 can be separated from the separation layer 102. Further alternatively, a fluoride gas such as $NF_3$, $BrF_3$, or $ClF_3$ may be introduced into the groove 128 and the separation layer may be removed by etching with the fluoride gas, so that the element layer 124 can be separated from the substrate having an insulating surface.

In this embodiment, the element layer 124 is separated from the substrate 100 by forming a metal oxide layer as a layer included in the separation layer 102, which touches the insulating layer 104; however, the present invention is not limited to this separation method. Another separation method may also be used in which a light-transmitting substrate is used as the substrate 100, an amorphous silicon layer containing hydrogen is used as the separation layer 102, and the separation layer 102 is irradiated with a laser beam from the side of the substrate 100 so that hydrogen contained in the amorphous silicon layer is vaporized, whereby the separation layer 102 can be separated from the substrate 100.

Alternatively, the substrate 100 may be mechanically polished or dissolved in a solution such as HF to be removed. In that case, it is not necessary to use the separation layer 102.

Figure 7C:
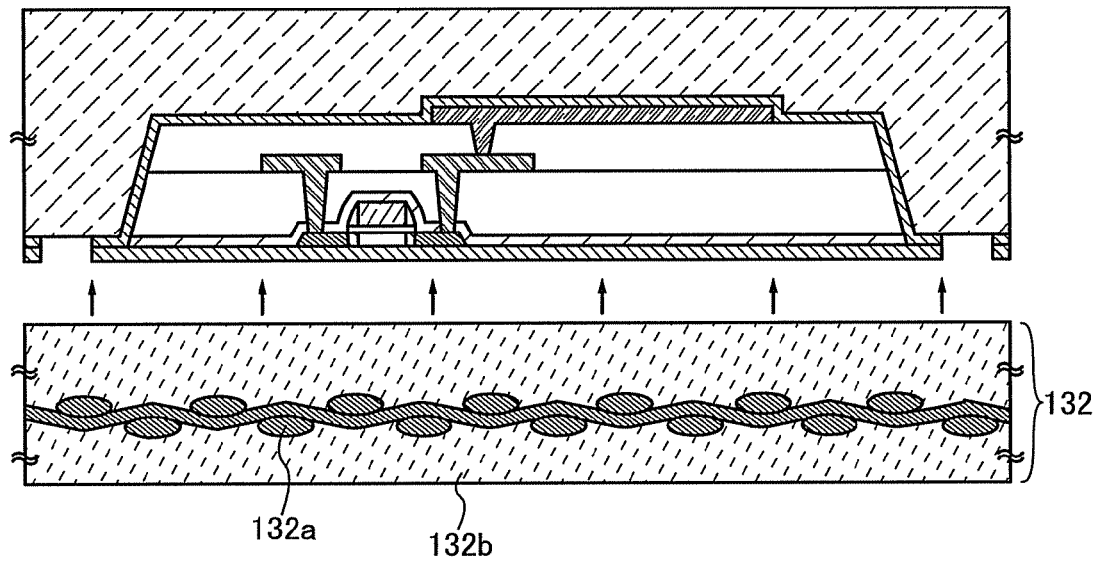

Next, a first structure body 132 in which a fibrous body 132a is impregnated with a first organic resin 132b is provided on a separation surface of the element layer 124 (the surface of the insulating layer 104 that is exposed by separation) (see FIG. 7C). Such a structure body 132 is also called a prepreg.

The prepreg is obtained in such a manner that a fibrous body is impregnated with a varnish in which a matrix resin is diluted with an organic solvent, and then the organic solvent is dried and volatilized so that the matrix resin is semi-cured. The thickness of the structure body is preferably 10 μm to 100 μm, and more preferably 10 μm to 30 μm. By using the structure body with such a thickness, thin electronic paper that can be bent can be manufactured.

As the first organic resin 132b, it is possible to use a thermosetting resin such as an epoxy resin, an unsaturated polyester resin, a polyimide resin, a bismaleimide-triazine resin, or a cyanate resin. Alternatively, a thermoplastic resin such as a polyphenylene oxide resin, a polyetherimide resin, or a fluorine resin may be used as the first organic resin 132b. By using the aforementioned organic resin, the fibrous body can be firmly bonded to the element layer 124 by heat treatment. Note that the higher the glass transition temperature of the first organic resin 132b is, the less the organic resin is damaged by locally applied force, which is preferable.

The fibrous body 132a is a woven or nonwoven fabric using high-strength fibers of an organic compound or an inorganic compound, and provided so that the warp yarns and the weft yarns cross each other. A high-strength fiber is specifically a fiber with a high tensile modulus of elasticity or a fiber with a high Young's modulus. As typical examples of the high-strength fiber, there are a polyvinyl alcohol fiber, a polyester fiber, a polyamide fiber, a polyethylene fiber, an aramid fiber, a polyparaphenylene benzobisoxazole fiber, a glass fiber, a carbon fiber, and the like. As the glass fiber, there is a glass fiber using E glass, S glass, D glass, Q glass, or the like. Note that the fibrous body 132a may be formed of one kind of the above high-strength fibers or plural kinds of the above high-strength fibers.

Next, the first organic resin 132b is plasticized or cured by thermocompression bonding of the first structure body 132. For example, in the case where a thermosetting epoxy resin is used as the first organic resin 132b, the first structure body 132 is provided on the separation surface of the element layer 124, and then subjected to thermocompression bonding, whereby the first organic resin 132b spreads evenly on the separation surface of the element layer 124 and is cured. In the case where a thermoplastic resin is used, the first structure body 132 is provided on the separation surface of the element layer 124 and subjected to thermocompression bonding, and then cooled to room temperature so that the plasticized organic resin can be cured.

The step of pressure-bonding the first structure body 132 can be performed under an atmospheric pressure or a reduced pressure.

Figure 8A:
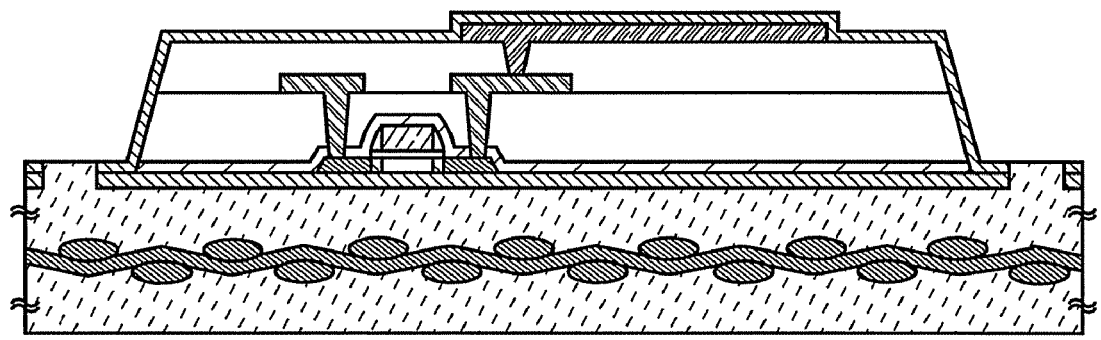
FIGS. 8A and 8B are diagrams illustrating an example of a method for manufacturing electronic paper.

Next, the adhesive sheet 130 is separated to expose the insulating layer 123 (see FIG. 8A).

Next, a charged particle-containing layer 134 is formed over the first electrode 122. For example, a binder 138 in which microcapsules 136 are dispersed and fixed is provided over the first electrode 122. Then, a second electrode 140 is formed over the charged particle-containing layer 134. Here, by using the binder 138 on which the second electrode 140 has been formed in advance, the charged particle-containing layer 134 and the second electrode 140 are provided over the first electrode 122 with the insulating layer 123 interposed therebetween (see FIG. 8B).

Each of the microcapsules 136 contains a positively-charged particle 136a of one color and a negatively-charged particle 136b of another color, which are dispersed in a solvent included in the microcapsule. The particle 136a or the particle 136b move to one side under the influence of an electric field applied between the first electrode 122 and the second electrode 140 to change the contrast of each pixel, whereby an image can be displayed.

Alternatively, a resin film can be used as the binder 138, and the microcapsules 136 can be dispersed and fixed in the resin film. Such a use of the binder 138 in which the microcapsules 136 are dispersed and fixed simplifies the manufacturing process.

Instead of the microcapsule, charged polymer fine particles (Electronic Liquid Powder) and the like may be provided. In that case, a positively-charged polymer fine particle of one color and a negatively-charged polymer fine particle of another color may be provided between the first electrode 122 and the second electrode 140.

Figure 9A:
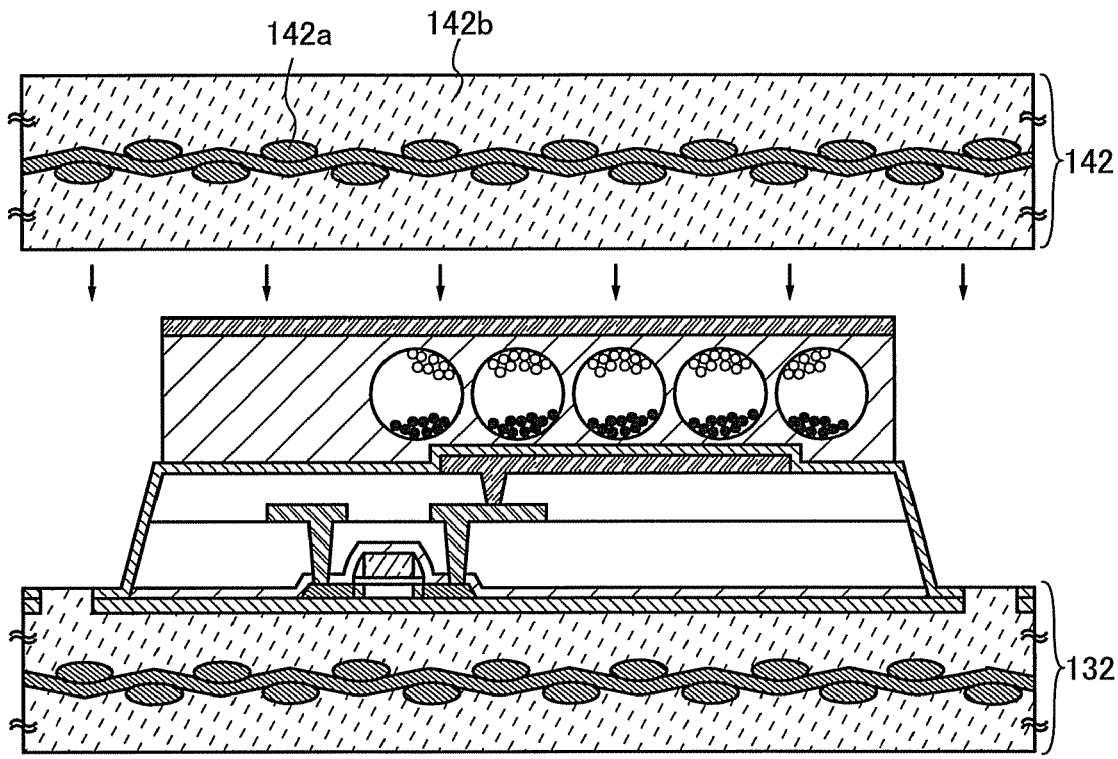
FIGS. 9A and 9B are diagrams illustrating an example of a method for manufacturing electronic paper.

Next, a second structure body 142 in which a fibrous body 142a is impregnated with a second organic resin 142b is provided over the second electrode 140 formed over the charged particle-containing layer 134 (see FIG. 9A). The second structure body 142 can have a structure similar to the first structure body 132.

Figure 9B:
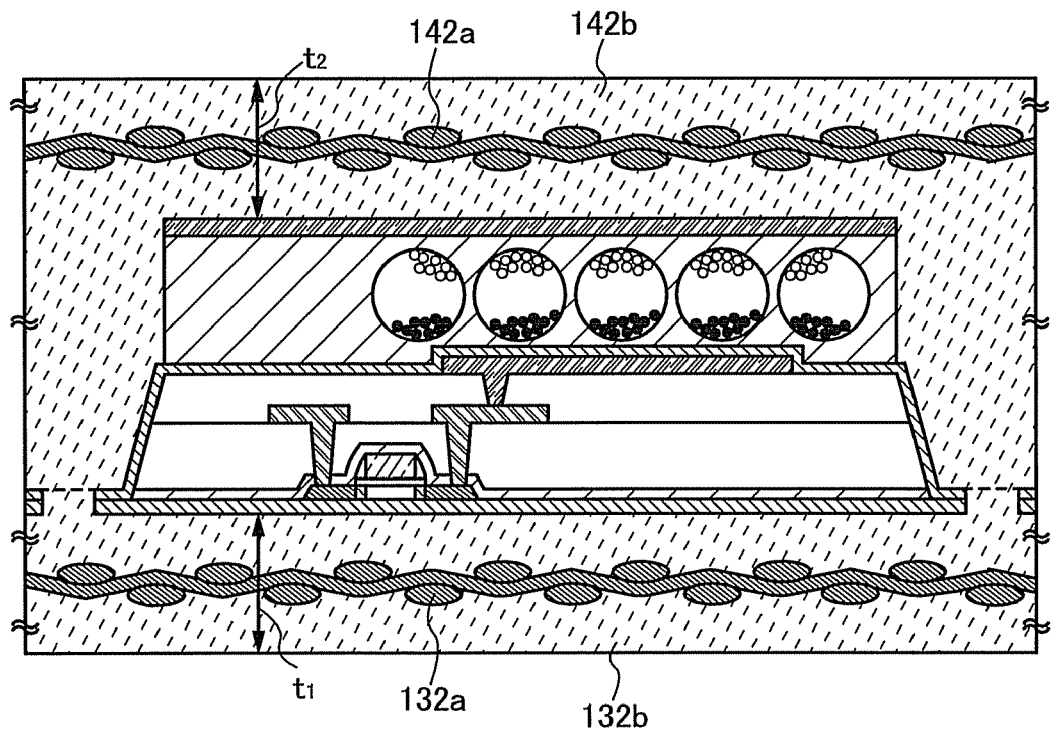

Then, the second structure body 142 is subjected to thermocompression bonding, whereby the second organic resin 142b is bonded to the first organic resin 132b (see FIG. 9B). Here, the first organic resin 132b and the second organic resin 142b are bonded to each other at the edges of the first structure body 132 and the second structure body 142 so as to seal the element formation layer. Note that the position in which the first organic resin 132b and the second organic resin 142b are bonded to each other (in the height direction) can be controlled by the pressure or temperature in bonding.

As shown in this embodiment, by providing the first structure body 132 and the second structure body 142 to cover the element formation layer, the resistance of the element formation layer to external stress can be increased. In addition, when the thickness $t_1$ of the first organic resin 132b is substantially equal to the thickness $t_2$ of the second organic resin 142b ($t_1 \approx t_2$) and the first structure body 132 and the second structure body 142 are symmetrically disposed with respect to the element formation layer (the element formation layer is placed in the middle of the first structure body 132) and the second structure body 142, the force applied to the element formation layer when the electronic paper is curved or the like can be evenly dispersed. As a result, damage to the element formation layer due to bending or warping of the electronic paper can be reduced.

This embodiment can be implemented in appropriate combination with the structures or manufacturing methods shown in the other embodiments of this specification.

Embodiment 3

In this embodiment, a method for manufacturing the electronic paper, which is different from that shown in the above embodiment, will be described with reference to drawings.

Figure 10A:
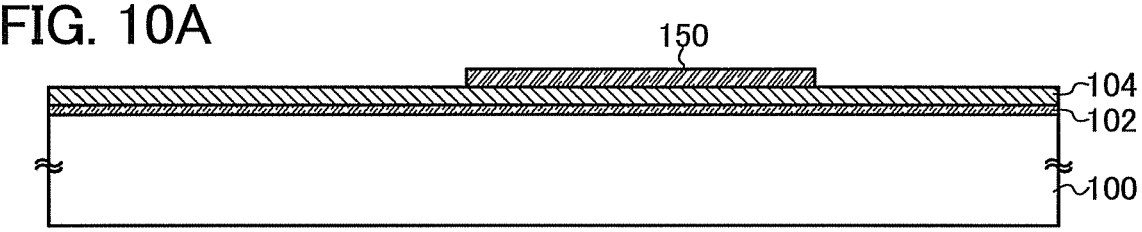
FIGS. 10A to 10D are diagrams illustrating an example of a method for manufacturing electronic paper.

First, the separation layer 102 is formed on a surface of the substrate 100 and the insulating layer 104 is continuously formed. Then, a first electrode 150 is formed over the insulating layer 104 (see FIG. 10A). The first electrode 150 functions as a pixel electrode.

The first electrode 150 can be made of indium tin oxide (ITO) in which tin oxide is mixed with indium oxide, indium tin silicon oxide (ITSO) in which silicon oxide is mixed with indium tin oxide (ITO), indium zinc oxide (IZO) in which zinc oxide is mixed with indium oxide, zinc oxide (ZnO), tin oxide ($SnO_2$), or the like. Alternatively, the first electrode 150 may be made of a reflective metal (for example, a material film containing aluminum or silver as its main component, or a multi-layer film of such a material film).

Figure 10B:
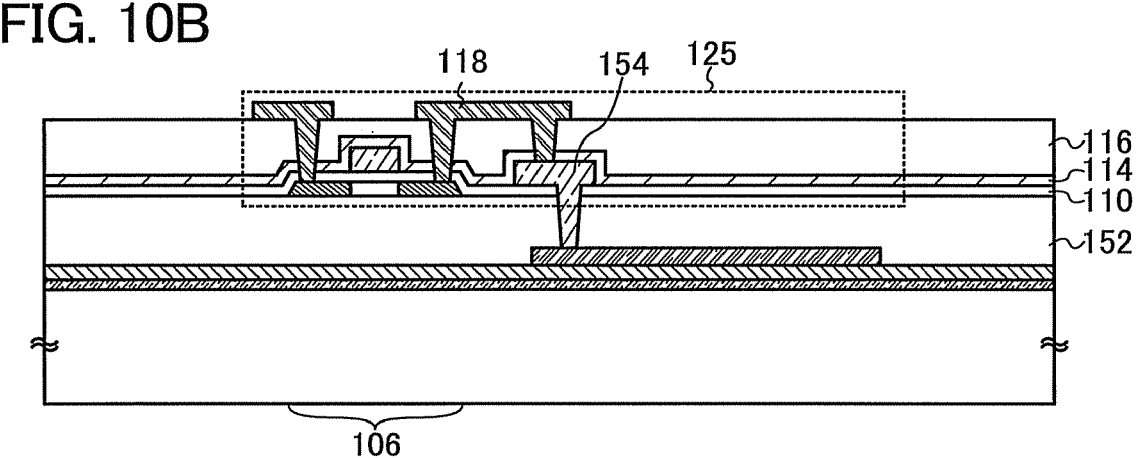

Then, an insulating layer 152 is formed over the first electrode 150, and the thin film transistor 106 is formed over the insulating layer 152. Then, the insulating layers 114 and 116 are formed over the thin film transistor 106, and the wirings 118 capable of functioning as the source and drain electrodes are formed over the insulating layer 116 (see FIG. 10B).

The thin film transistor 106 may have a variety of structures such as a single-drain structure, an LDD (lightly-doped drain) structure, or a gate-overlap drain structure. The thin film transistor 106 shown here has a single-drain structure.

One of the wirings 118 is electrically connected to the first electrode 150. Here, the wiring 118 is electrically connected to the first electrode 150 through a conductive layer 154. The conductive layer 154 can be formed at the same time (in the same process) as the gate electrode of the thin film transistor 106.

Figure 10C:
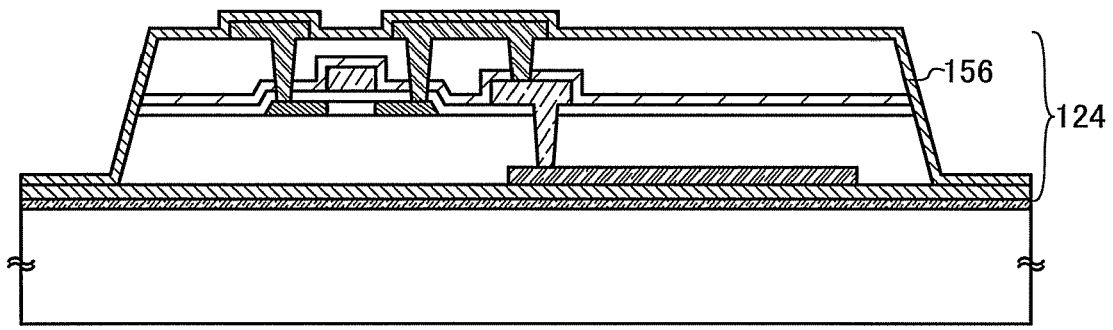

Next, the insulating layers on the edge of the substrate 100 are removed by etching or the like, and then, an insulating layer 156 is formed to cover the wirings 118 (see FIG. 10C). Here, after the insulating layer 152 and the like are removed to expose at least the insulating layer 104, the insulating layer 156 is formed. In the case where a plurality of panels are formed over one substrate, the insulating layers are etched on the edge of each region in which each panel is formed, and are divided into separate elements constituting each panel.

The insulating layer 156 serves as a barrier layer, and is preferably formed to cover at least the integrated circuit portion 125 including the thin film transistor 106. Here, the integrated circuit portion 125 and the first electrode 150 are surrounded by the insulating layer 104 and the insulating layer 156 serving as barrier layers. As the insulating layer 156, a nitrogen-containing layer (silicon nitride, silicon nitride oxide, silicon oxynitride, or the like) can be used.

Figure 10D:
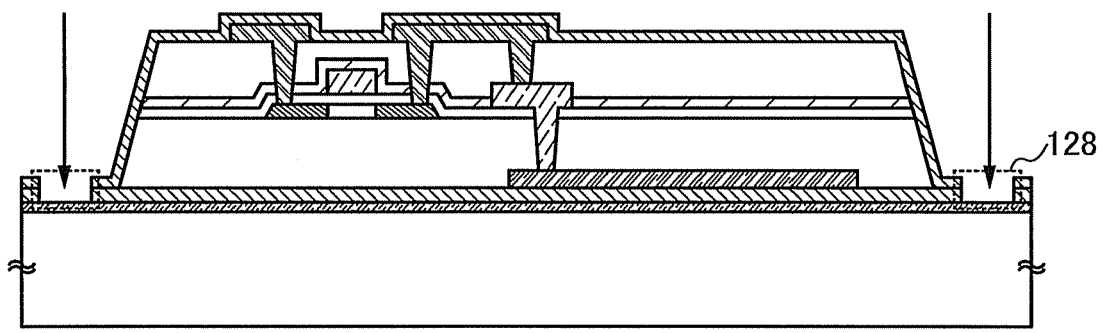

In order that the element layer 124 including the thin film transistor 106 and the like is easily separated from the substrate 100, a groove is preferably formed by laser light irradiation before the element layer 124 is separated from the substrate 100. Here, the groove 128 is formed by irradiating the insulating layers 156 and 104 on the edge of the substrate with laser light (see FIG. 10D).

Figure 11A:
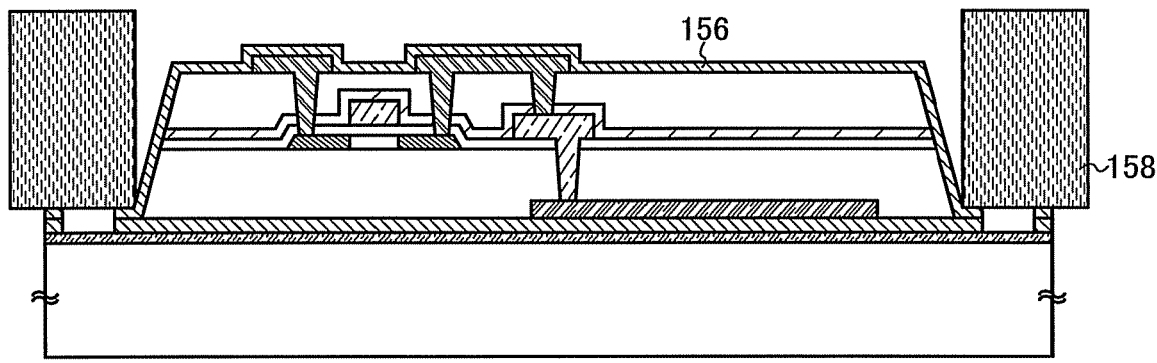
FIGS. 11A to 11C are diagrams illustrating an example of a method for manufacturing electronic paper.

Next, a separate film 158 is formed to cover at least the groove 128 (see FIG. 11A).

Figure 11B:
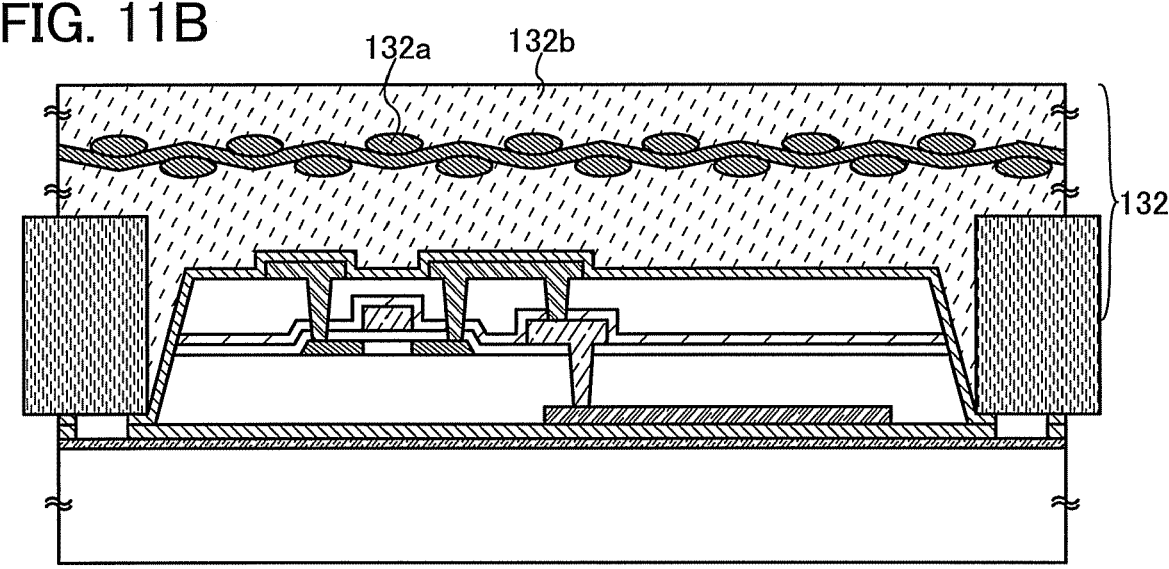

Next, the first structure body 132 in which the fibrous body 132a is impregnated with the first organic resin 132b is provided on the surface of the insulating layer 156 (see FIG. 11B). Then, the first structure body 132 is subjected to thermocompression bonding, whereby the first organic resin 132b of the first structure body 132 is firmly bonded to the insulating layer 156.

The first structure body 132 bonded to the insulating layer 156 facilitates the separation, and further reduces the stress applied to the element layer 124 before and after the separation and suppresses damage to the thin film transistor 106, which results in improved yield.

In addition, the separate film 158, which is provided before the first structure body 132 is bonded to the insulating layer 156, suppresses separation defects in which the first organic resin 132b enters the groove 128 to be attached to the separation layer 102.

Figure 11C:
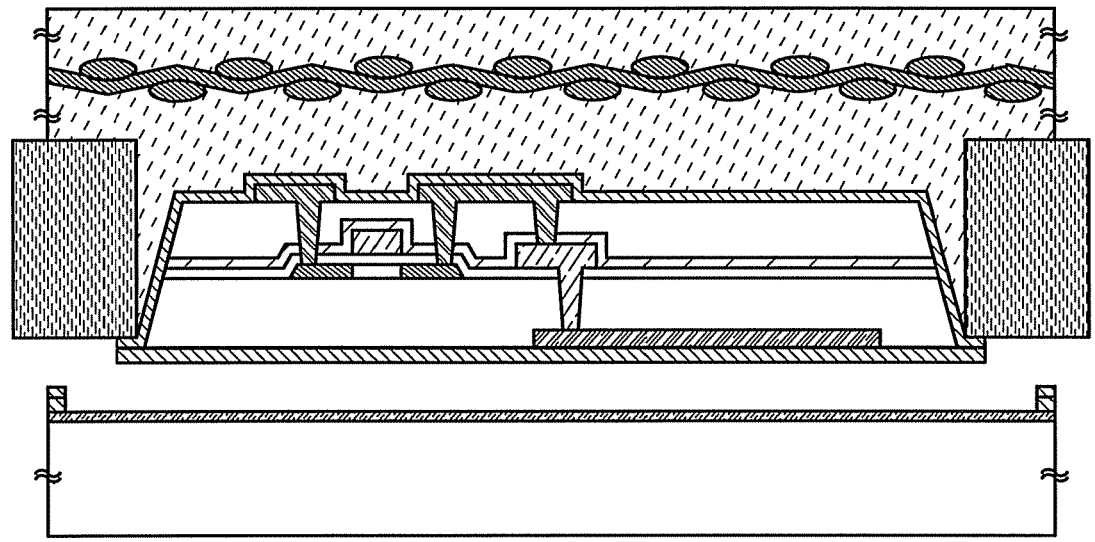
Figure 12A:
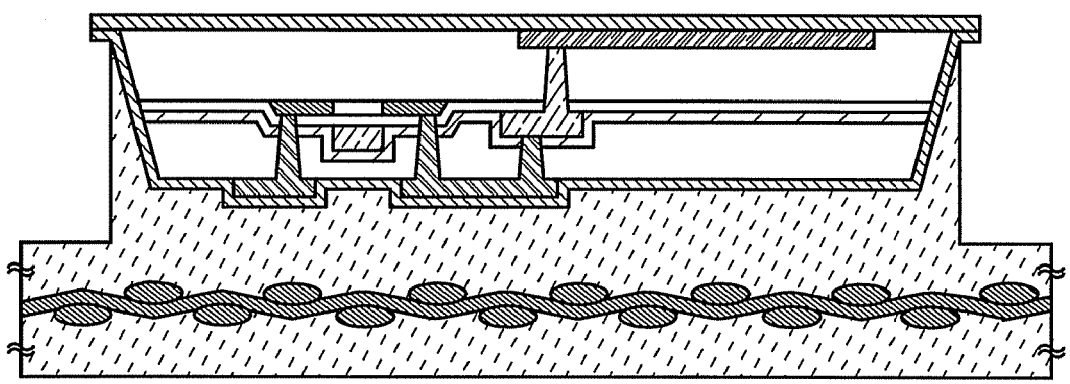
FIGS. 12A and 12B are diagrams illustrating an example of a method for manufacturing electronic paper.

Next, the element layer 124 is separated from the substrate 100 at the interface between the separation layer 102 and the insulating layer 104 serving as a buffer layer (see FIG. 11C). The separation starts from the groove 128. After the separation, the separate film 158 is removed (see FIG. 12A).

Figure 12B:
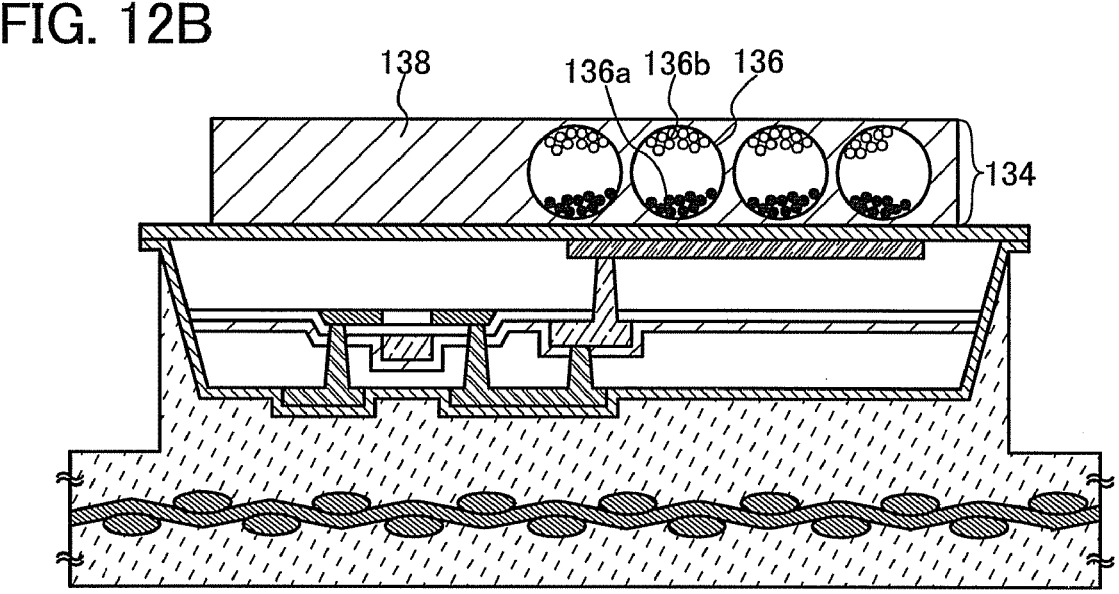

Next, the charged particle-containing layer 134 is formed over the first electrode 122 (see FIG. 12B).

Figure 13A:
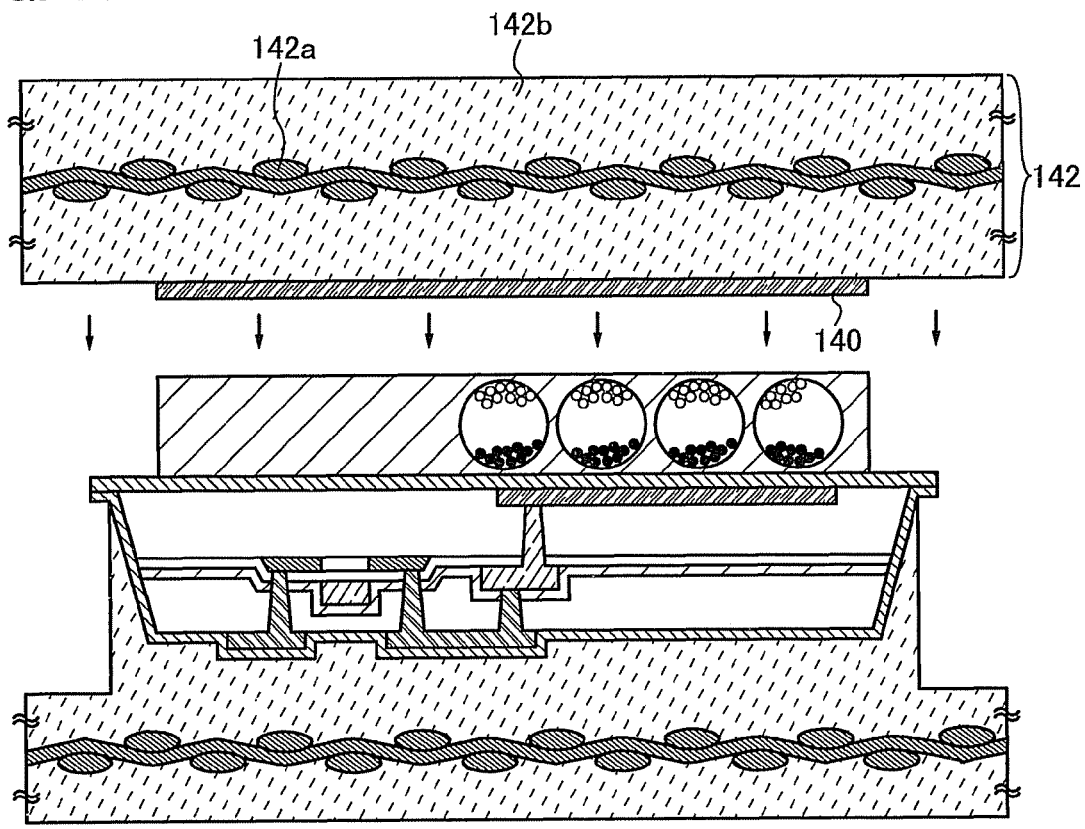
FIGS. 13A and 13B are diagrams illustrating an example of a method for manufacturing electronic paper.
Figure 13B:
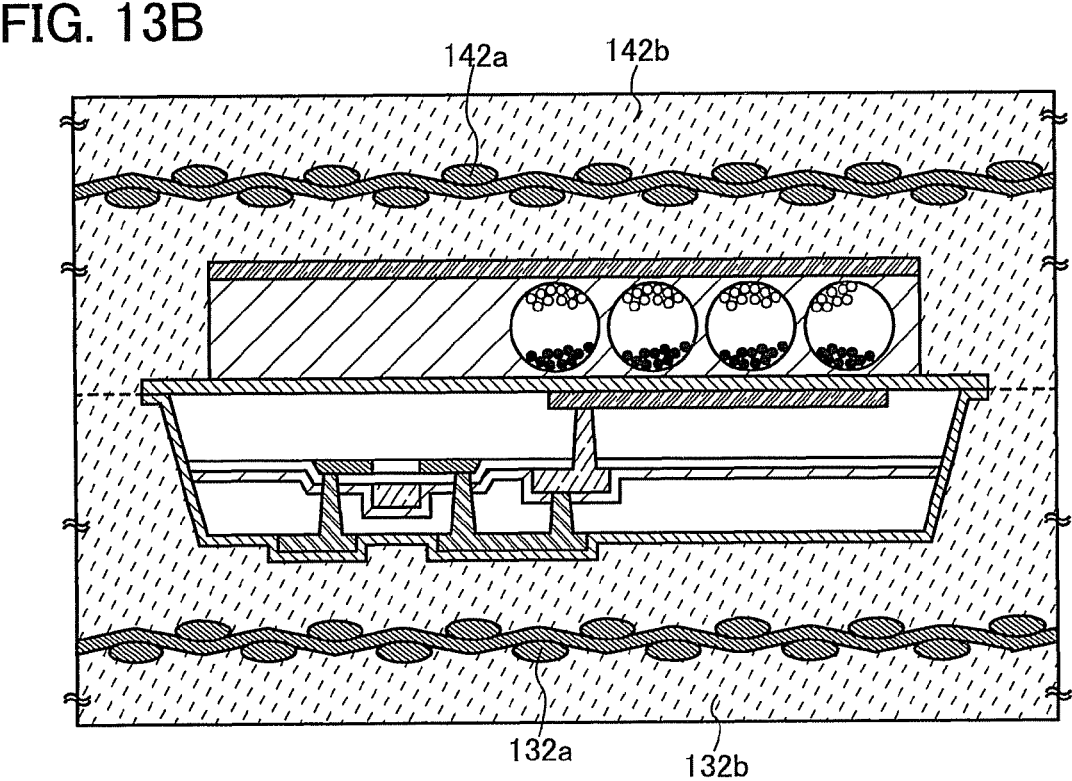

Next, the second structure body 142 on which the second electrode 140 has been formed in advance is provided over the charged particle-containing layer 134 (see FIG. 13A). Here, the second electrode 140 is formed on the second organic resin 142b that is semi-cured. Then, the second structure body 142 is subjected to thermocompression bonding while the second electrode 140 faces the charged particle-containing layer 134, whereby the second organic resin 142b is bonded to the first organic resin 132b (see FIG. 13B).

Through the above steps, the electronic paper can be manufactured.

This embodiment can be implemented in appropriate combination with the structures or manufacturing methods shown in the other embodiments of this specification.

Embodiment 4

In this embodiment, a method for manufacturing a display device including a thin film transistor that is formed by a process at a relatively low temperature (lower than 500° C.) (such as a thin film transistor with an amorphous semiconductor film, a microcrystalline semiconductor film, or the like, a thin film transistor with an organic semiconductor film, or a thin film transistor with an oxide semiconductor) will be described below.

Figure 14A:
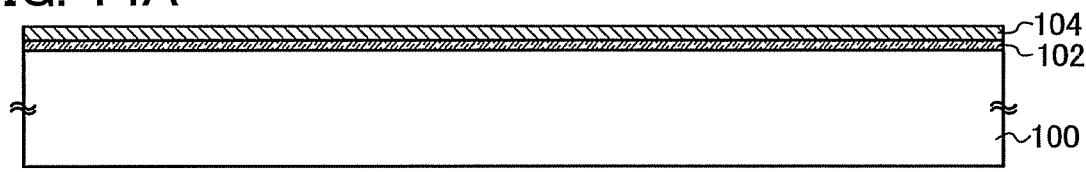
FIGS. 14A to 14E are diagrams illustrating an example of a method for manufacturing electronic paper.

First, the separation layer 102 is formed on a surface of the substrate 100, and then the insulating layer 104 is formed (see FIG. 14A). The separation layer 102 and the insulating layer 104 can be formed continuously.

Figure 14B:
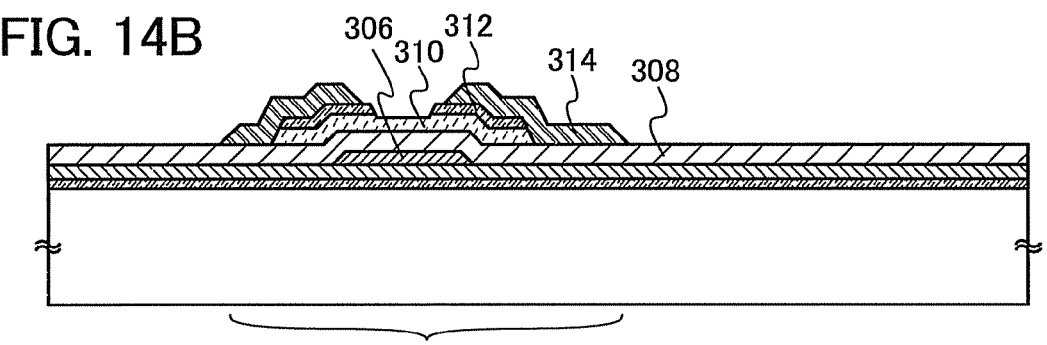

Next, a thin film transistor 304 is formed over the insulating layer 104 (see FIG. 14B). In this embodiment, as the thin film transistor, an inverted staggered thin film transistor having a channel formation region that is made of an amorphous semiconductor, a microcrystalline semiconductor, an organic semiconductor, or an oxide semiconductor is described.

The thin film transistor 304 has at least a gate electrode 306, a gate insulating layer 308, and a semiconductor layer 310. Over the semiconductor layer 310, impurity semiconductor layers 312 serving as a source region and a drain region may be formed. In addition, wirings 314 are formed in contact with the impurity semiconductor layers 312.

The gate electrode 306 can be formed having a single-layer structure or a multi-layer structure using a metal material such as chromium, copper, neodymium, or scandium or an alloy containing any of these metal materials as its main component, as well as the metal given as an example for the gate electrode 112 in the above embodiment. Alternatively, a semiconductor layer typified by polycrystalline silicon doped with an impurity element such as phosphorus or an AgPdCu alloy may be used. Further alternatively, a conductive oxide or a composite oxide made of indium, gallium, aluminum, zinc, tin, or the like may be used. For example, a transparent gate electrode may be formed using indium tin oxide (ITO).

The gate electrode 306 can be formed by forming a conductive layer over the insulating layer 104 by sputtering or vacuum evaporation using the aforementioned material, forming a mask over the conductive layer by photolithography, ink-jet, or the like, and etching the conductive layer using the mask.

Alternatively, the gate electrode 306 can be formed by discharging a conductive nanopaste of silver, gold, copper, or the like onto the substrate by ink-jet and baking the conductive nanopaste. Note that in order to improve the adhesion between the gate electrode 306 and the insulating layer 104, a nitride layer of the aforementioned metal material may be provided between the insulating layer 104 and the gate electrode 306. Here, the gate electrode 306 is formed by forming a conductive layer over the insulating layer 104 and etching the conductive layer using a resist mask that is formed using a photomask.

Note that an end portion of the gate electrode 306 is preferably tapered in order to prevent disconnection at a portion with a difference in height, for a semiconductor layer and wirings are formed over the gate electrode 306 in later steps. To make the end portion of the gate electrode 306 tapered, etching may be performed with a resist mask receding. For example, by mixing an oxygen gas into an etching gas, etching can be performed with a resist mask receding.

In the step of forming the gate electrode 306, a gate wiring (a scan line) can also be formed at the same time. Note that a scan line refers to a wiring for selecting a pixel, and a capacitor wiring refers to a wiring connected to one electrode of a storage capacitor in a pixel. Note that the present invention is not limited thereto, and one or both of a gate wiring and a capacitor wiring may be formed separately from the gate electrode 306.

The gate insulating layer 308 can be formed having a single-layer structure or a multi-layer structure using silicon oxide, silicon nitride, silicon oxynitride, silicon nitride oxide, hafnium oxide, hafnium aluminum oxide, hafnium silicon oxynitride, or yttria by CVD, sputtering, pulsed laser deposition (PLD), or the like. When the gate insulating layer 308 is formed at a high frequency (1 GHz or more) using a microwave plasma CVD apparatus, the dielectric strength between the gate electrode and the drain and source electrodes can be improved, so that a highly reliable thin film transistor can be obtained.

The semiconductor layer 310 is a non-single-crystal semiconductor layer having a thickness of 10 nm to 200 nm, and preferably a thickness of 20 nm to 150 nm. As the non-single-crystal semiconductor layer, an amorphous semiconductor layer, a microcrystalline semiconductor layer, or the like can be used. As the semiconductor, silicon, germanium, a silicon-germanium compound, or the like can be used. A feature of this embodiment is to form the semiconductor layer 310 directly over the gate insulating layer 308 at a low temperature lower than 500° C. without performing laser light irradiation, heat treatment, or the like. With the use of a layer containing at least molybdenum as the separation layer 302, a separation process can be easily carried out even when a thin film transistor is formed at a low temperature lower than 500° C.

Note that the semiconductor layer 310 may have a structure in which a microcrystalline semiconductor layer is formed in contact with the gate insulating layer and an amorphous semiconductor layer is stacked thereover. The semiconductor layer 310 may alternatively be formed of a non-single-crystal semiconductor which contains nitrogen or an NH group and includes crystal grains having an inverted conical or pyramidal shape and/or microcrystal grains having a grain size of 1 nm to 10 nm, preferably, 1 nm to 5 nm, in an amorphous structure.

As the semiconductor layer 310, an impurity element imparting one conductivity type, such as phosphorus imparting n-type conductivity, may be added to an amorphous semiconductor or a microcrystalline semiconductor. Alternatively, as the semiconductor layer 310, a metal element which reacts with silicon to form silicide, such as titanium, zirconium, hafnium, vanadium, niobium, tantalum, chromium, molybdenum, tungsten, cobalt, nickel, or platinum, may be added to an amorphous semiconductor or a microcrystalline semiconductor. By addition of an impurity element imparting one conductivity type, a metal element which reacts with silicon to form silicide, or the like, the carrier mobility of a semiconductor layer can be increased. Thus, the field-effect mobility of a thin film transistor having the semiconductor layer as a channel formation region can be increased.

The semiconductor layer 310 can also be made of metal oxide or an organic semiconductor material. As typical examples of the metal oxide, there are zinc oxide and zinc—gallium—indium oxide.

The impurity semiconductor layers 312 may be formed using a semiconductor layer to which an impurity element imparting one conductivity type is added. In the case where an n-channel thin film transistor is formed, phosphorus may be used as the impurity element imparting one conductivity type; typically, the impurity semiconductor layers 312 are made of amorphous silicon or microcrystalline silicon which contains phosphorus. In the case where a p-channel thin film transistor is formed, boron may be used as the impurity element imparting one conductivity type; typically, the impurity semiconductor layers 312 are made of amorphous silicon or microcrystalline silicon which contains boron.

When including an impurity element imparting one conductivity type, phosphorus or boron in this embodiment, at a concentration of $1 \times 10^{19}$ cm$^{-3}$ to $1 \times 10^{21}$ cm$^{-3}$, the impurity semiconductor layers 312 can make ohmic contact with the wirings 314 and serve as a source region and a drain region.

The impurity semiconductor layers 312 each are formed to a thickness of 10 nm to 100 nm, and preferably 30 nm to 50 nm.

The wirings 314 can be formed of the materials listed for the wirings 118 in the above embodiment. For example, a conductive oxide or a composite oxide made of indium, gallium, aluminum, zinc, or tin may be used for the wirings 314.

Figure 14C:
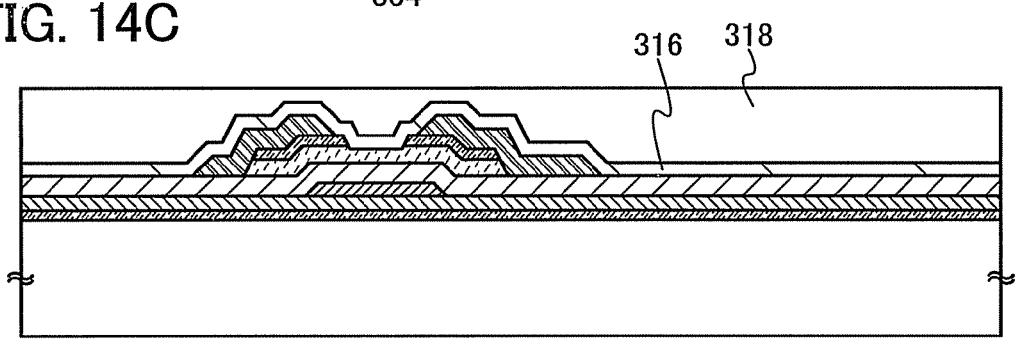

Next, an insulating layer 316 and an insulating layer 318 are formed to cover the thin film transistor 304 (see FIG. 14C). The thin film transistor 304 can be applied to a switching transistor of a pixel of electronic paper, like the thin film transistors shown in Embodiments 2 and 3.

Next, an opening 321 is formed to reach the source electrode or the drain electrode that is formed by the wiring 314. Note that when the opening 323 is formed, the insulating layer 316 and/or the insulating layer 318 on the edge of the substrate 100 are removed by etching or the like. In this embodiment, it is preferable that at least the insulating layer 318 be removed so that the insulating layer 316 is exposed. Note that in the case where a plurality of panels are formed over one substrate, it is preferable that at least the insulating layer 318 be etched on the edge of each region in which each panel is formed, and divided into separate elements constituting each panel.

Figure 14D:
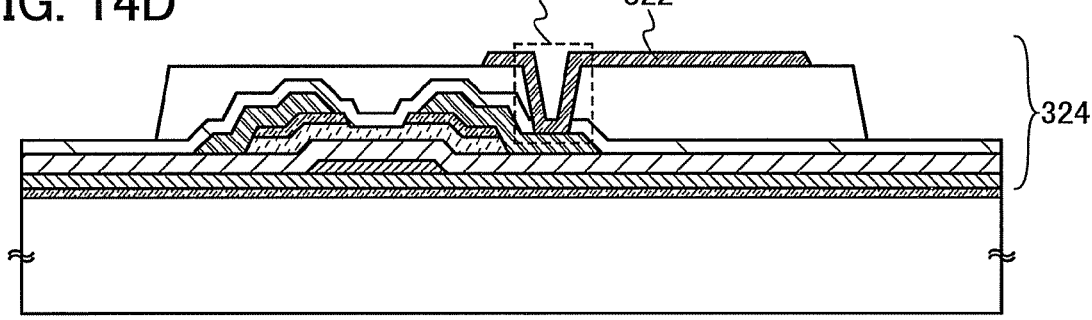

Next, a first electrode 322 functioning as a pixel electrode is provided over the insulating layers 316 and 318 to be connected to the source electrode or the drain electrode through the opening 323 (see FIG. 14D). In addition, a barrier layer may be formed to cover the thin film transistor 304 and the first electrode 322 as illustrated in FIG. 6D.

The insulating layer 316 can be made of a material similar to that of the gate insulating layer 308. In addition, the insulating layer 316 is preferably made of silicon nitride that is dense so as to prevent the entry of an impurity element which may be a contaminant, such as an organic substance, a metal, or moisture floating in the air. The insulating layer 318 can be formed in a manner similar to the insulating layer 116 described in the above embodiment. The first electrode 322 functioning as a pixel electrode can be formed in a manner similar to the first electrode 122 shown in the above embodiment.

Figure 14E:
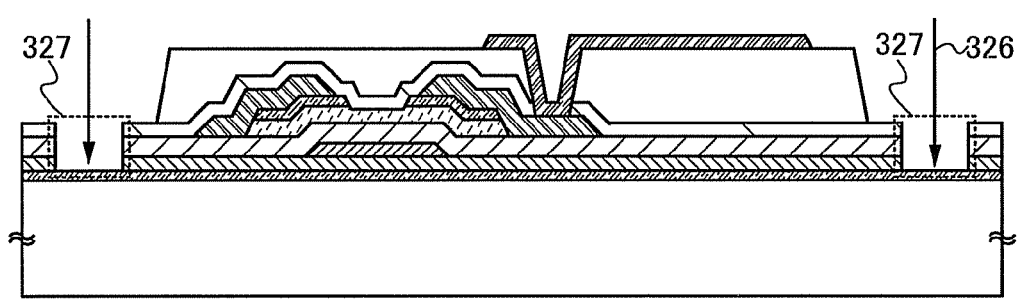

Before the element layer 324 is separated from the substrate 100, a groove 327 is preferably formed by laser light irradiation. Here, the groove 327 is formed by irradiating the gate insulating layer 308 and the insulating layer 104 exposed on the edge of the substrate with laser light 326 (see FIG. 14E).

Figure 15:
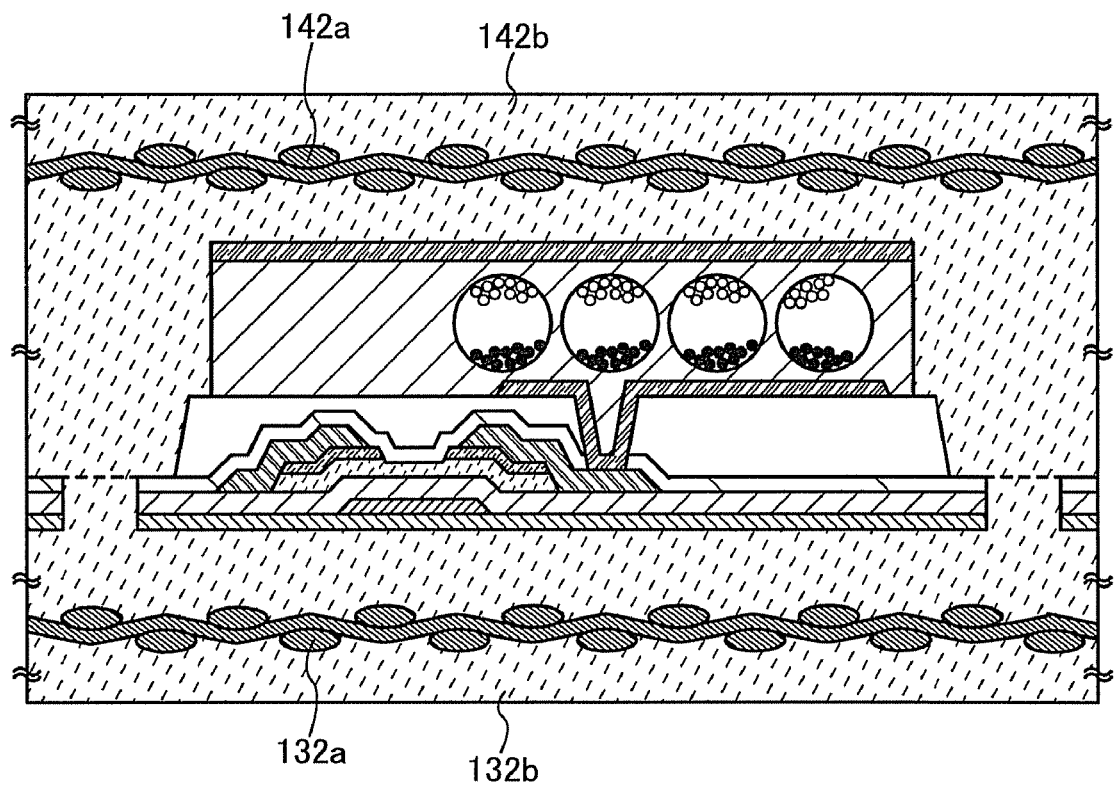
FIG. 15 is a diagram illustrating an example of a method for manufacturing electronic paper.

The subsequent steps are performed in a manner similar to those illustrated in FIGS. 7A to 9A, whereby the electronic paper can be manufactured (see FIG. 15).

By applying this embodiment, the manufacturing steps can be performed at a relatively low temperature (less than 500° C.).

This embodiment can be implemented in appropriate combination with the structures or manufacturing methods shown in the other embodiments of this specification.

Embodiment 5

In this embodiment, a method for manufacturing electronic paper with a smaller number of steps will be described below. Specifically, a method for manufacturing electronic paper that includes a thin film transistor made of an oxide semiconductor will be described below.

Figure 16A:
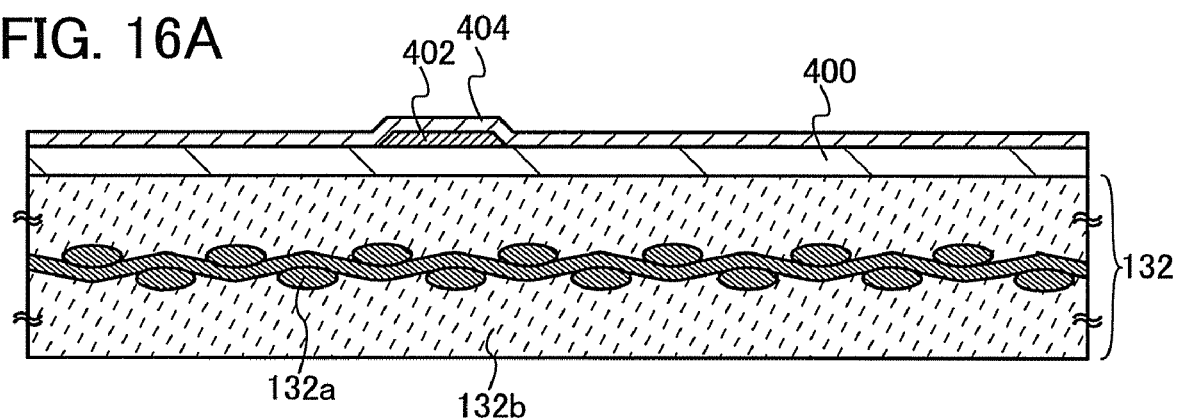
FIGS. 16A to 16D are diagrams illustrating an example of a method for manufacturing electronic paper.

First, a gate electrode 402 is formed over the first structure body 132, and a gate insulating layer 404 is formed over the gate electrode 402 (see FIG. 16A). The gate electrode 402 and the gate insulating layer 404 are formed of materials similar to those of the gate electrode 306 and the gate insulating layer 308 that are shown in the above embodiment.

In this embodiment, the first structure body 132 in which the fibrous body 132a is impregnated with the first organic resin 132b is used as a substrate. Note that the first organic resin 132b may be a cured or semi-cured organic resin.

Before the gate electrode 402 is formed over the first structure body 132 that serves as a substrate, an insulating layer 400 serving as a base film may be formed between the first structure body 132 and the gate electrode 402. This insulating layer 400 prevents an impurity such as moisture or alkali metal from diffusing into a TFT element from the first structure body 132 and prevents a decrease in reliability or the like of a semiconductor element formed in an element formation layer, and may be provided as a blocking layer as appropriate.

The insulating layer 400 is made of an insulating material such as silicon oxide, silicon nitride, silicon oxynitride, or silicon nitride oxide. For example, when the insulating layer 400 has a two-layer structure, a silicon nitride oxide layer may be formed as the first insulating layer and a silicon oxynitride layer may be formed as the second insulating layer. Alternatively, a silicon nitride layer may be formed as the first insulating layer and a silicon oxide layer may be formed as the second insulating layer.

Figure 16B:
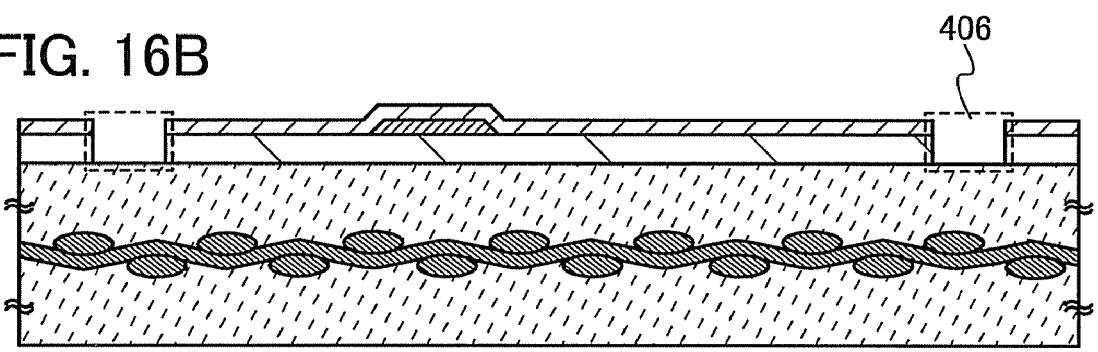

Next, with the use of a resist mask that is formed using a photomask, a contact hole is formed in the gate insulating layer 404 to expose a connection pad of the gate electrode 402. At the same time, a peripheral portion is etched to form a groove 406. In the case where the insulating layer 400 serving as a base film is provided, the insulating layer 400 as well as the gate insulating layer 404 is processed by dry etching to form the groove 406 (see FIG. 16B).

By removing the gate insulating layer and the insulating layer 400 serving as a base layer in the peripheral portion, thermal fusion of prepregs can be achieved in a later step. For dry etching, a mixed gas of $CHF_3$ is used; however, the present invention is not limited to this example.

Figure 16C:
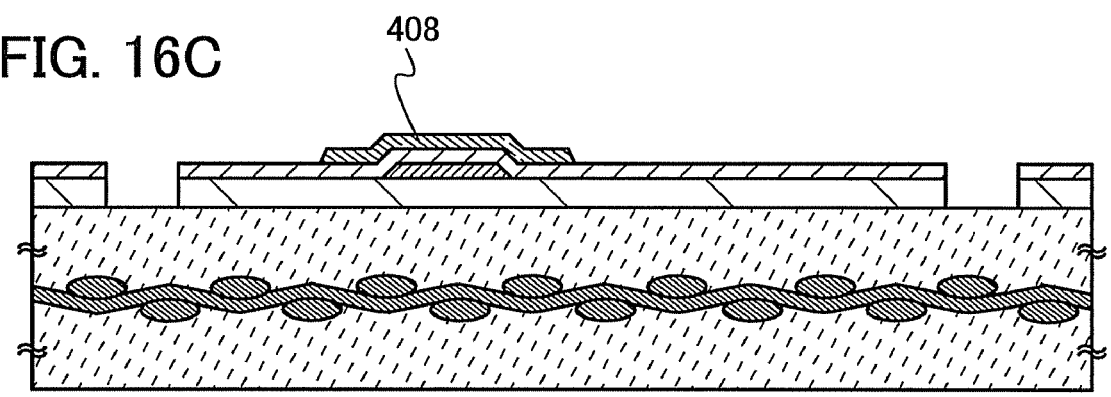

Next, a semiconductor layer is deposited over the gate insulating layer 404, and then, with the use of a resist mask that is formed using a photomask, the semiconductor layer is etched using a diluted hydrochloric acid or an organic acid, e.g., a citric acid, to form a semiconductor layer 408 (see FIG. 16C). Then, the photoresist is removed using an organic solvent.

The semiconductor layer 408 is formed using an oxide semiconductor layer. For the oxide semiconductor layer, a composite oxide of an element selected from indium, gallium, aluminum, zinc, and tin can be used. As examples thereof, there are zinc oxide (ZnO), indium oxide containing zinc oxide (IZO), oxide containing indium oxide, gallium oxide, and zinc oxide (IGZO). An oxide semiconductor can be deposited as a film at a temperature lower than the upper temperature limit of a prepreg by sputtering, pulsed laser deposition (PLD), or the like and can thus be formed directly over the prepreg.

The semiconductor layer may be formed to a thickness of 10 μm to 200 nm, and preferably 20 nm to 150 μm. It is preferable to control the oxygen concentration in a deposition atmosphere because carrier density increases and characteristics of a thin film transistor degrade if oxygen vacancies increase in a film.

In the case of using oxide containing indium oxide, gallium oxide, and zinc oxide, the semiconductor layer 408 has a high degree of freedom for the relative proportions of the metal elements and functions as a semiconductor over a wide range of mixing ratios. Indium oxide containing zinc oxide of 10 wt. % (IZO), and a material in which indium oxide, gallium oxide, and zinc oxide are mixed together in equimolar amounts (IGZO) can be given as examples.

In this embodiment, a method using IGZO is described as an example of the method for forming the semiconductor layer 408. A semiconductor layer is formed by direct current (DC) sputtering at an output of 500 W using a target that has a diameter of 8 inches and is obtained by sintering an equimolar mixture of indium oxide ($In_2O_3$), gallium oxide ($Ga_2O_3$), and zinc oxide (ZnO). The semiconductor layer is deposited to a thickness of 100 nm under conditions where the chamber pressure is 0.4 Pa and the gas flow ratio of $Ar/O_2$ is 10/5 (sccm). It is preferable that oxygen partial pressure during deposition be set higher than that under deposition conditions for a transparent conductive film such as an indium tin oxide (ITO) film so that oxygen vacancies can be reduced.

Next, wirings 412 and 414 are formed over the semiconductor layer 408. The wirings 412 and 414 can be made of a material similar to that of the wirings 314 shown in the above embodiment.

Figure 16D:
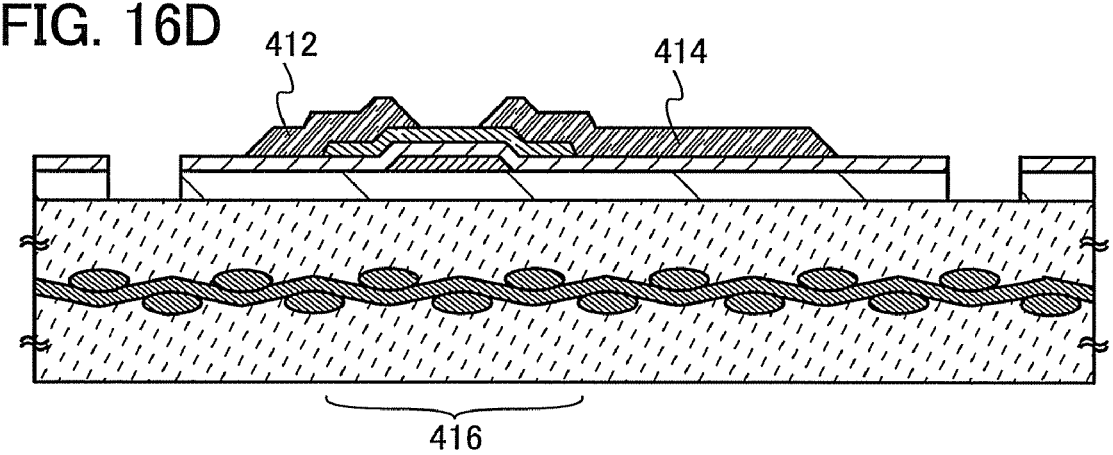

The wirings 412 and 414 are formed such that part of the semiconductor layer 408 is exposed by a lift-off method in which after a resist mask is formed over at least the semiconductor layer 408, a conductive layer is formed over the resist mask, the semiconductor layer 408, and the gate insulating layer 404 by sputtering or vacuum evaporation and then the resist is removed (see FIG. 16D).

Through the above steps, the thin film transistor including a semiconductor layer made of an oxide semiconductor can be manufactured. The thin film transistor of this embodiment can be applied to a switching thin film transistor of a pixel of electronic paper, like the thin film transistors shown in the above embodiments.

Figure 17A:
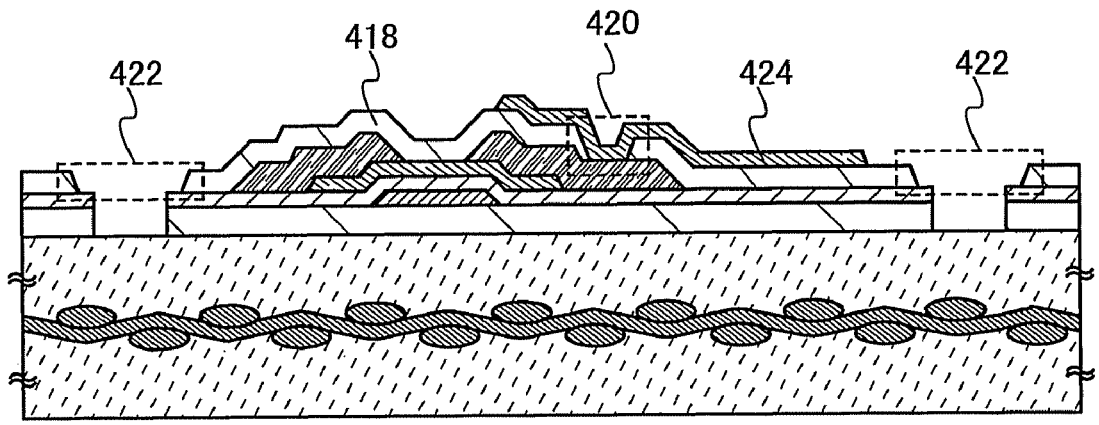
FIGS. 17A and 17B are diagrams illustrating an example of a method for manufacturing electronic paper.

After an insulating layer 418 including openings 420 and 422 is formed, a first electrode 424 functioning as a pixel electrode is provided over the insulating layer 418 to be connected to the wiring 414 through the opening 420 (see FIG. 17A).

The insulating layer 418 can be formed in a manner similar to the insulating layer 316 shown in the above embodiment. In the case where an insulating layer is formed on the entire surface of the substrate, the openings 420 and 422 can be formed by forming a resist mask by photolithography and etching the insulating layer using the mask. Alternatively, the insulating layer 418 including the openings 420 and 422 may be formed by printing or droplet discharging.

Through the above steps, the thin film transistor can be formed over the prepreg. In this embodiment, the thin film transistor can be formed directly over the prepreg without performing the separation process; therefore, the number of steps for forming a flexible element substrate can be reduced.

Figure 17B:
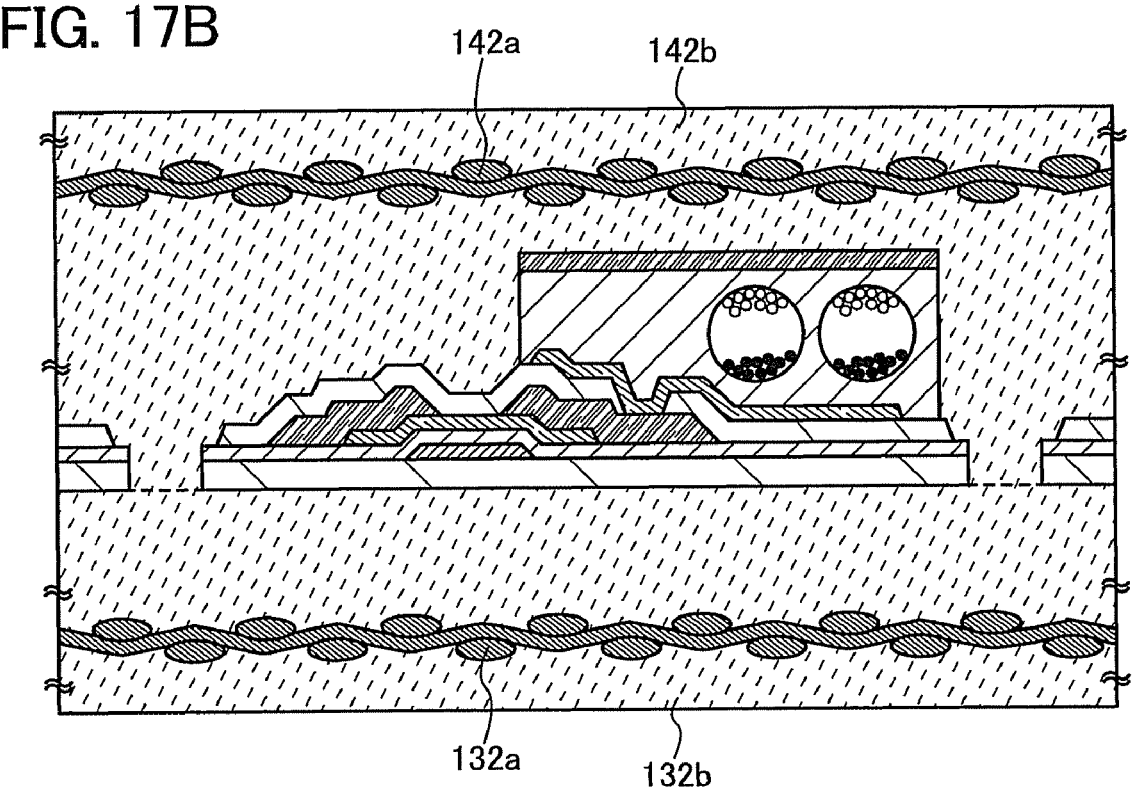

The subsequent steps are performed in a manner similar to those illustrated in FIGS. 8B to 9A, whereby the electronic paper can be manufactured (see FIG. 17B).

This embodiment can be implemented in appropriate combination with the structures or manufacturing methods shown in the other embodiments of this specification.

Embodiment 6

In this embodiment, electronic paper having a structure different from that shown in Embodiment 1 will be described with reference to drawings. Specifically, each of a first insulating film and a second insulating film that are firmly bonded to an element formation layer to seal the element formation layer includes stacked insulating layers having different properties against external stress, so that the resistance of the electronic paper to external stress can be increased.

The electronic paper shown in this embodiment includes the first insulating film 51 and the second insulating film 52 that are shown in the above embodiment. As the first insulating film 51, a first structure body 71 and a first protective film 75 are stacked, and as the second insulating film 52, a second structure body 72 and a second protective film 76 are stacked (see FIG. 2). That is, the structure illustrated in FIG. 2 corresponds to a structure in which the first protective film 75 and the second protective film 76 are added to the aforementioned structure illustrated in FIG. 1A.

The first structure body 71 and the first protective film 75 are made of insulators having different properties against external stress. Here, the first structure body 71 and the first protective film 75 are stacked in this order from the side of the element formation layer 53. Similarly, the second structure body 72 and the second protective film 76 are stacked in this order from the side of the element formation layer 53.

The first structure body 71 can be obtained by impregnating the fibrous body 71a with the first organic resin 71b, and the second structure body 72 can be obtained by impregnating the fibrous body 72a with the second organic resin 72b. In that case, each of the first structure body 71 and the second structure body 72 preferably has a modulus of elasticity of 13 GPa or more and a modulus of rupture of less than 300 MPa. In this embodiment, the first structure body 71 and the second structure body 72 serve as an impact-resistant layer against the force externally applied to the element formation layer 53.

The first protective film 75 and the second protective film 76 are preferably made of a material having a lower modulus of elasticity and higher rupture strength than the first structure body 71 and the second structure body 72, and a rubber-elastic film may be used. For example, the first protective film 75 and the second protective film 76 are made of a high-strength material such as a polyvinyl alcohol resin, a polyester resin, a polyamide resin, a polyethylene resin, an aramid resin, a polyparaphenylene benzobisoxazole resin, or a glass resin. By using the high-strength material having elasticity for the first protective film 75 and the second protective film 76, load such as locally applied force can be evenly dispersed and absorbed, which can prevent damage to the electronic paper.

More specifically, the first protective film 75 and the second protective film 76 can be made of an aramid resin, a polyethylene terephthalate (PET) resin, a polyethylene naphthalate (PEN) resin, a polyethersulfone (PES) resin, a polyphenylene sulfide (PPS) resin, a polyimide (PI) resin, or the like. Furthermore, each of the first protective film 75 and the second protective film 76 preferably has a modulus of elasticity of 5 GPa to 12 GPa and a modulus of rupture of 300 MPa or more. In this embodiment, the first protective film 75 and the second protective film 76 serve as an impact-dispersing layer that disperses the force externally applied to the element formation layer 53.

In this manner, the first structure body 71 and the second structure body 72 each serving as an impact-resistance layer are stacked on the first protective film 75 and the second protective film 76 each serving as an impact-dispersing layer, respectively. Thus, the force locally applied to the element formation layer 53 can be reduced, which can prevent damage to the electronic paper, defects of the characteristics of the electronic paper, and the like.

In addition, when the first insulating film 51 in which the first structure body 71 is stacked on the first protective film 75 and the second insulating film 52 in which the second structure body 72 is stacked on the second protective film 76 are symmetrically disposed with respect to the element formation layer 53, the force applied to the element formation layer 53 when the electronic paper is curved or the like can be evenly dispersed; therefore, damage to the element formation layer 53 due to bending or warping of the electronic paper can be reduced.

Figure 2:
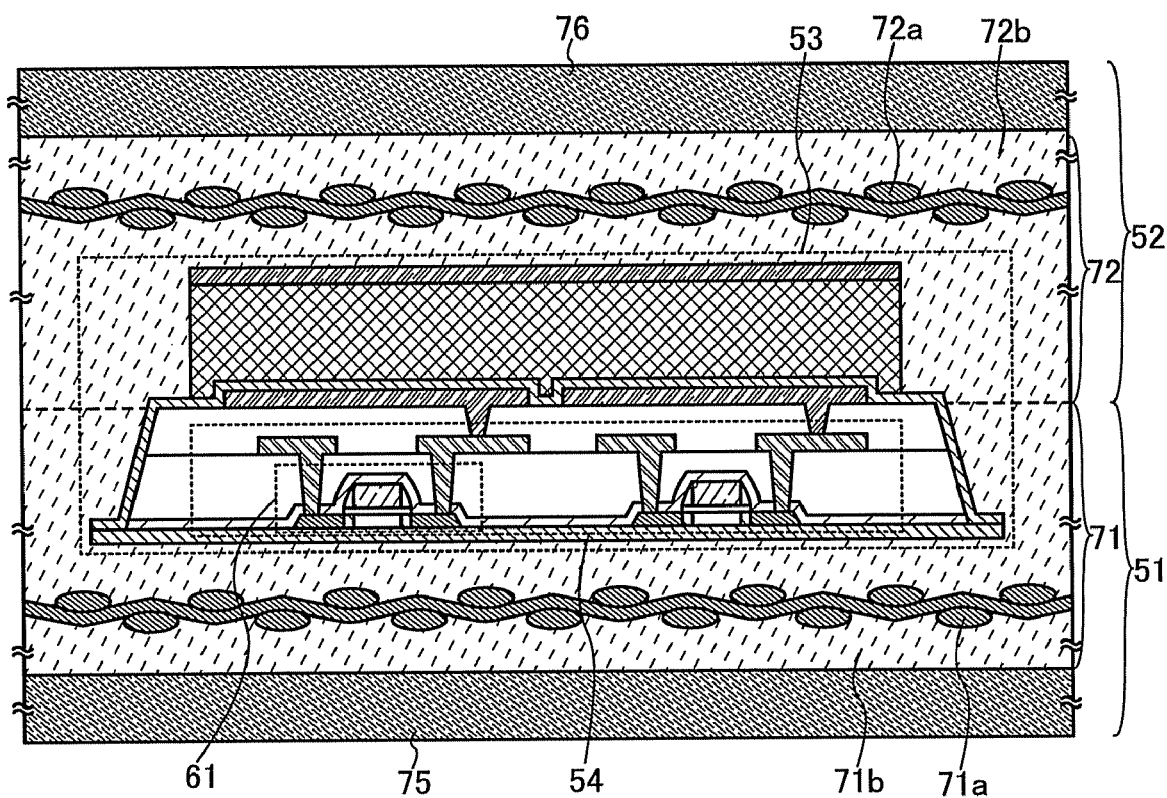
FIG. 2 is a diagram illustrating an example of electronic paper.

Next, a method for manufacturing the structure illustrated in FIG. 2 will be briefly described.

After the aforementioned steps illustrated in FIGS. 6A to 7B are performed, the first structure body 132 is provided on the separation surface of the element layer. Then, a first protective film 191 is adhered to a surface of the first organic resin 132b before the first organic resin 132b is cured. After that, the first structure body 132 and the first protective film 191 are subjected to thermocompression bonding so that the first organic resin 132b is plasticized or cured, whereby a stack of the first structure body 132 and the first protective film 191 can be obtained (see FIG. 18A).

For example, in the case where a thermosetting epoxy resin is used as the first organic resin 132b, the first structure body 132 is provided on the separation surface of the element layer 124 and the first protective film 191 is provided on the surface of the first structure body 132, and then, thermocompression bonding is performed, whereby the first organic resin 132b and the first protective film 191 can be stacked in this order on the separation surface of the element layer 124. In the case where a thermoplastic resin is used, the first structure body 132 is provided on the separation surface of the element layer 124 and the first protective film 191 is provided on the surface of the first structure body 132. Then, the first structure body 132 and the first protective film 191 are bonded to the element layer 124 by thermocompression bonding, and then cooled to room temperature so that the plasticized organic resin can be cured.

The first protective film 191 can prevent the elements such as transistors from being damaged in compression bonding, which results in improved yield.

Figure 8B:
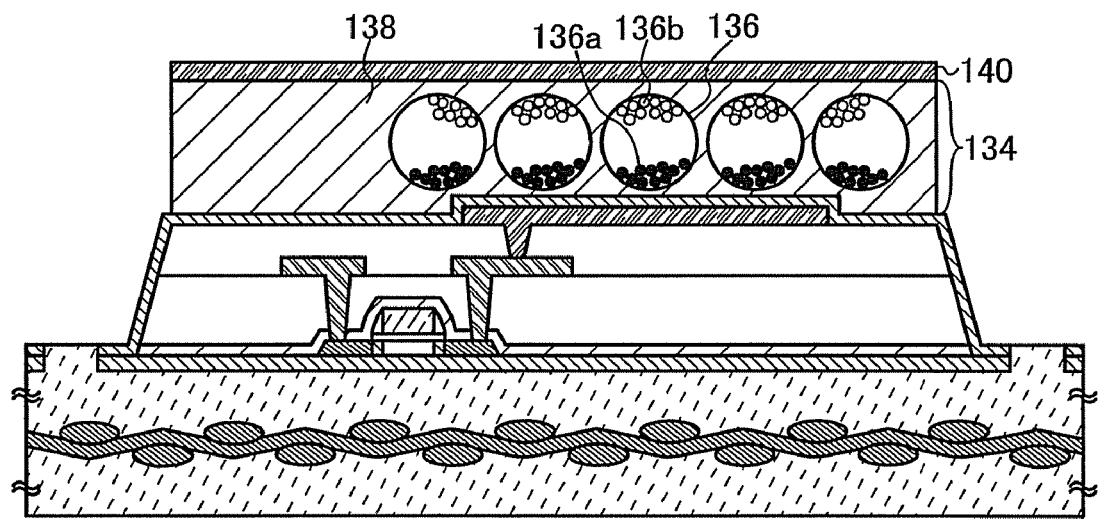

After the aforementioned steps illustrated in FIGS. 8A and 8B are performed, the second structure body 142 is provided on the second electrode 140. A second protective film 192 is adhered to the surface of the second organic resin 142b before the second organic resin 142b is cured. Then, the second structure body 142 and the second protective film 192 are subjected to thermocompression bonding, whereby a stack of the second structure body 142 and the second protective film 192 can be obtained (see FIG. 18B).

Also in the aforementioned manufacturing steps of Embodiments 3 to 5, the protective film is adhered to the organic resin that is not cured and then the organic resin is cured, whereby a stack of the structure body and the protective film can be manufactured.

This embodiment can be implemented in appropriate combination with the structures or manufacturing methods shown in the other embodiments of this specification.

Embodiment 7

In this embodiment, electronic paper having a structure different from that shown in Embodiment 1 will be described with reference to drawings. Specifically, a conductive film is provided on surfaces of a first insulating film and a second insulating film. Accordingly, static electricity applied to the electronic paper by electrostatic discharge can be diffused and discharged, whereby charges can be prevented from being localized (a local potential difference can be prevented).

Figure 3A:
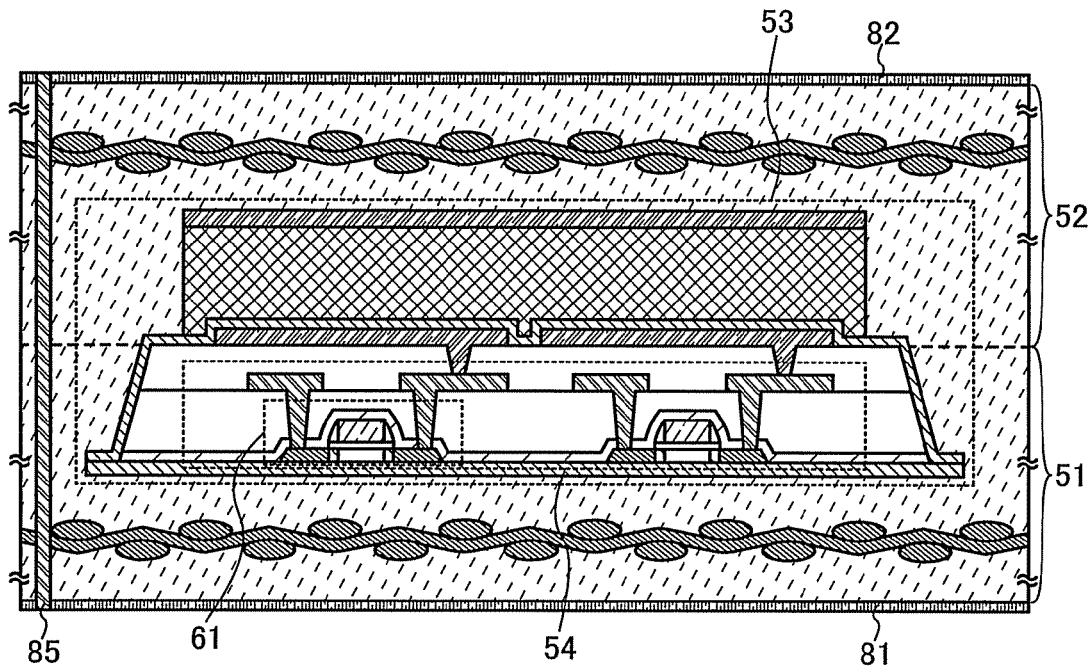
FIGS. 3A and 3B are diagrams each illustrating an example of electronic paper.
Figure 3B:
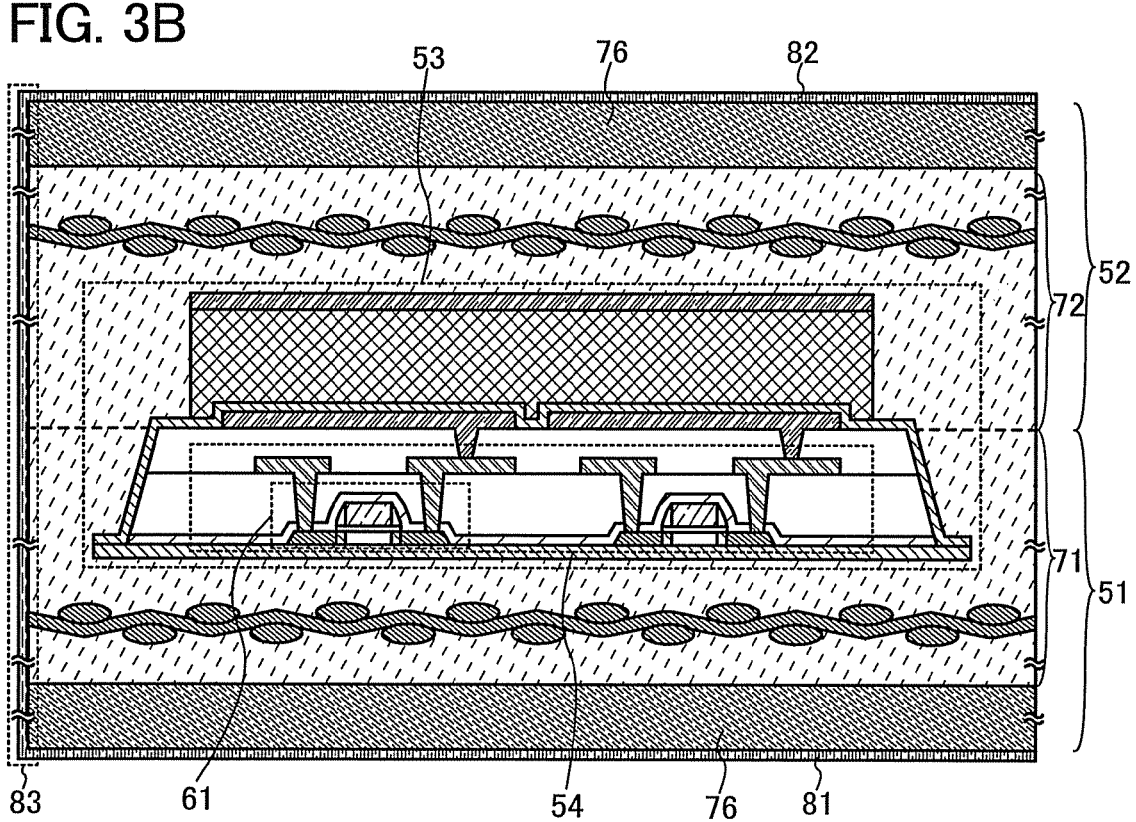

In the electronic paper shown in this embodiment, a first conductive film 81 and a second conductive film 82 that are electrically connected to each other are provided on the surfaces of the first insulating film 51 and the second insulating film 52 shown in the above embodiment, respectively (see FIGS. 3A and 3B).

That is, the structure illustrated in FIG. 3A corresponds to a structure in which the first conductive film 81, the second conductive film 82, and a conductor 85 for electrically connecting the first conductive film 81 and the second conductive film 82 are added to the aforementioned structure illustrated in FIG. 1A. The structure illustrated in FIG. 3B corresponds to a structure in which the first conductive film 81 and the second conductive film 82 are added to the structure illustrated in FIG. 2.

By providing the first conductive film 81 and the second conductive film 82, static electricity applied by electrostatic discharge can be diffused and discharged, or localization of charges can be prevented. Thus, damage and display defects of the electronic paper due to static electricity can be suppressed.

The first conductive film 81 and the second conductive film 82 need to be provided in a region overlapping at least the element formation layer 53. For example, as illustrated in FIGS. 3A and 3B, the first conductive film 81 and the second conductive film 82 may be provided on the entire surfaces of the first insulating film 51 and the second insulating film 52, respectively. If the conductive film is provided on the entire surface of the insulating film, a wide region can be protected against static electricity.

In particular, when the first conductive film 81 provided on the surface of the first insulating film 51 is electrically connected to the second conductive film 82 provided on the surface of the second insulating film 52, static electricity can be effectively diffused and localization of charges can be effectively prevented. Accordingly, it is possible to more effectively prevent damage and display defects of the electronic paper due to static electricity.

The first conductive film 81 can be electrically connected to the second conductive film 82 by providing a conductor 83 on the sides of the first insulating film 51 and the second insulating film 52 as illustrated in FIG. 3B. In that case, the conductor 83 can be made of the same material as the first conductive film 81 and the second conductive film 82.

Alternatively, the first conductive film 81 can be electrically connected to the second conductive film 82 by using the conductor 85 that penetrates the first insulating film 51 and the second insulating film 52 as illustrated in FIG. 3A.

Note that the conductive film may be provided on one of the surfaces of the first insulating film 51 and the second insulating film 52. Furthermore, even in the case where the conductive films are provided on the surfaces of the first insulating film 51 and the second insulating film 52, the first conductive film 81 and the second conductive film 82 are not necessarily electrically connected to each other.

The electronic paper shown in this embodiment displays images by using the charged particle-containing layer 56 so that the images are seen from the outside. Therefore, the conductive films provided on the surfaces of the first insulating film 51 and the second insulating film 52 need to be made of a conductive material transmitting light (at least in the visible region), as well as need to suppress damage and display defects of the electronic paper due to static electricity. In other words, the first conductive film 81 and the second conductive film 82 are preferably made of a conductive material transmitting light, or formed to be thin enough to transmit light.

For example, the first conductive film 81 and the second conductive film 82 can be made of indium tin oxide (ITO) in which tin oxide is mixed with indium oxide, indium tin silicon oxide (ITSO) in which silicon oxide is mixed with indium tin oxide (ITO), indium zinc oxide (IZO) in which zinc oxide is mixed with indium oxide, zinc oxide (ZnO), tin oxide ($SnO_2$), or the like.

The first conductive film 81 and the second conductive film 82 can also be made of a material with a low resistivity, such as titanium or aluminum. If a material with a low resistivity is used, the sheet resistance of the first conductive film 81 and the second conductive film 82 can be sufficiently reduced even when they have an extremely small thickness. Thus, static electricity can be effectively diffused while light transmittance is maintained.

The first conductive film 81 and the second conductive film 82 may also be made of metal, metal nitride, metal oxide, or the like other than the aforementioned titanium, aluminum, indium tin oxide, and the like, or may have a multi-layer structure of such a conductive film.

Alternatively, the first conductive film 81 and the second conductive film 82 may be made of a conductive macromolecule (also referred to as a conductive polymer). As the conductive macromolecule, a so-called π-electron conjugated conductive polymer can be used. As the π-electron conjugated conductive polymer, for example, there are polyaniline and/or a derivative thereof, polypyrrole and/or a derivative thereof, polythiophene and/or a derivative thereof, and a copolymer of plural kinds of those materials.

The first conductive film 81 and the second conductive film 82 can be formed by a dry process such as sputtering, plasma CVD, or evaporation, or by coating, printing, droplet discharging (ink-jet), plating, or the like.

In the case where an integrated circuit portion includes an antenna for wireless communication with the outside, the first conductive film 81 and the second conductive film 82 are made to have such a thickness that electromagnetic waves for communicating data with the outside pass therethrough and images can be recognized.

Next, a method for manufacturing the structure illustrated in FIG. 3A will be briefly described.

First, as shown in the above embodiment, the first insulating film 51 and the second insulating film 52 are firmly bonded to the element formation layer 53 to seal the element formation layer 53. Then, the first conductive film 81 and the second conductive film 82 are formed by a dry process such as sputtering, plasma CVD, or evaporation, or by coating, printing, droplet discharging (ink-jet), plating, or the like. Next, an opening penetrating the first insulating film 51 and the second insulating film 52 is formed and filled with the conductor 85, whereby the first conductive film 81 is electrically connected to the second conductive film 82. Note that the opening is formed in a region that does not overlap the element formation layer 53.

Alternatively, an opening may be formed before the first conductive film 81 and the second conductive film 82 are formed, and the first conductive film 81, the second conductive film 82, and the conductor 85 may be formed at the same time by plating. Further alternatively, instead of providing an opening, a needle-like conductor 85 may be stuck in the first insulating film 51 and the second insulating film 52 to penetrate the insulating films 51 and 52, so that the first conductive film 81 can be electrically connected to the second conductive film 82.

Next, a method for manufacturing the structure illustrated in FIG. 3B will be briefly described.

Figure 18A:
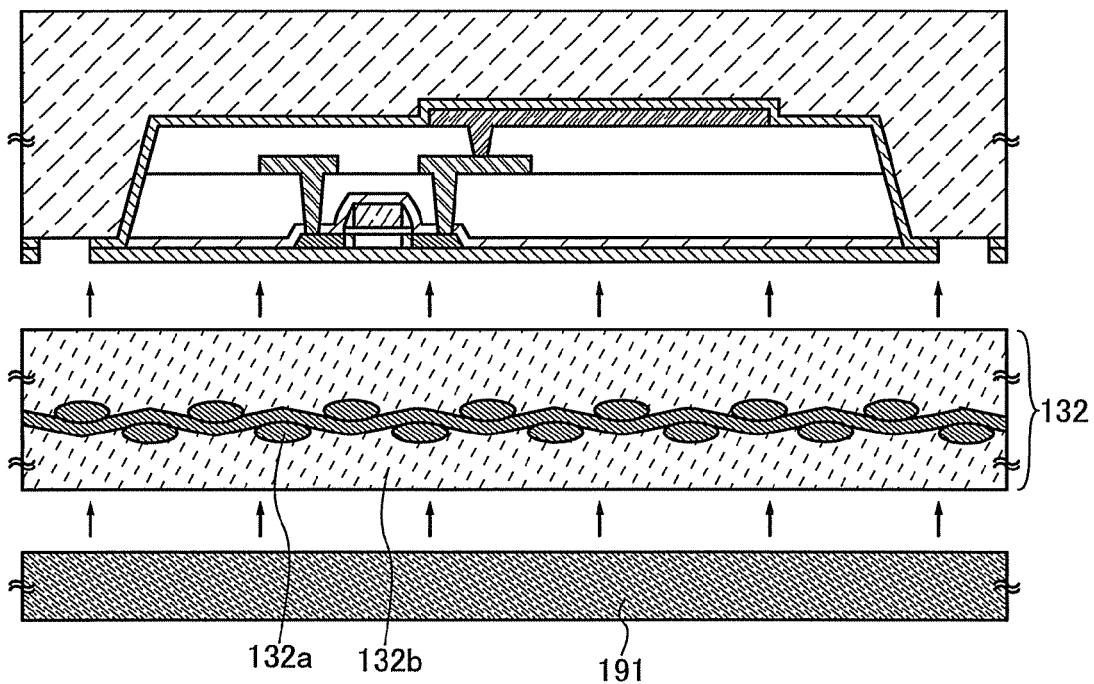
FIGS. 18A and 18B are diagrams illustrating an example of a method for manufacturing electronic paper.
Figure 19A:
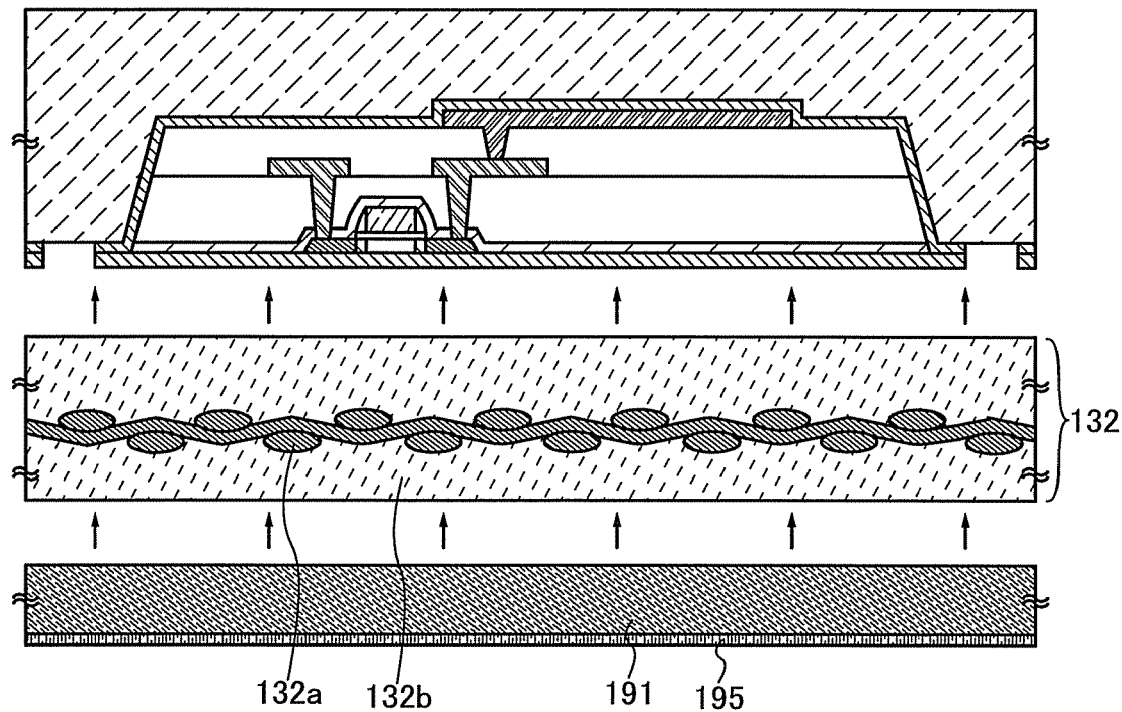
FIGS. 19A and 19B are diagrams illustrating an example of a method for manufacturing electronic paper.

First, in FIG. 18A, the first structure body 132 is provided on the separation surface of the element layer. Then, the first protective film 191 on which a first conductive film 195 has been provided in advance is adhered to a surface of the first organic resin 132*b* before the first organic resin 132*b* is cured. After that, the first structure body 132, the first protective film 191, and the first conductive film 195 are subjected to thermocompression bonding so that the first organic resin 132*b* is plasticized or cured, whereby a stack of the first structure body 132, the first protective film 191, and the first conductive film 195 can be obtained (see FIG. 19A).

Figure 18B:
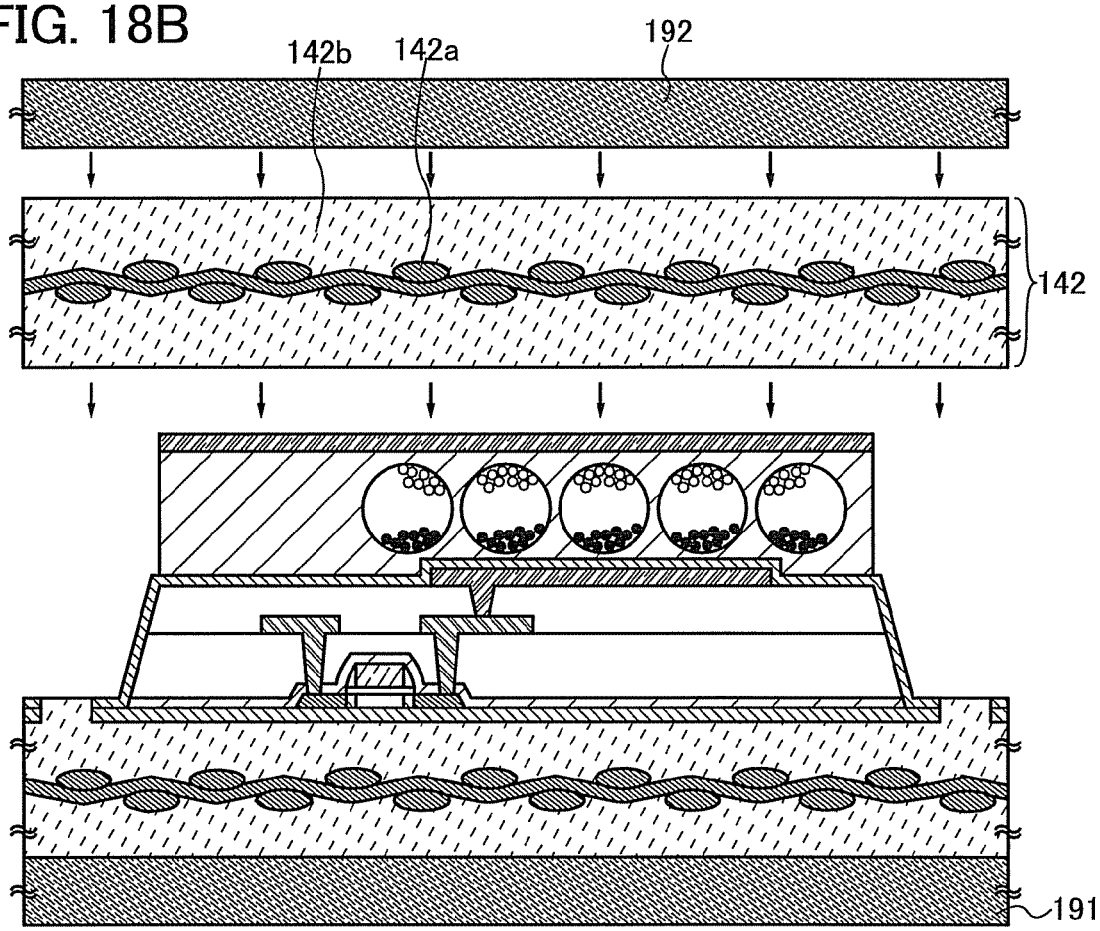

Also in FIG. 18B, the second structure body 142 is provided on the second electrode 140. The second protective film 192 on which a second conductive film 196 has been provided in advance is adhered to the surface of the second organic resin 142*b* before the second organic resin 142*b* is cured. Then, the second structure body 142 and the second protective film 192 are subjected to thermocompression bonding, whereby a stack of the second structure body 142, the second protective film 192, and the second conductive film 196 can be obtained.

Figure 19B:
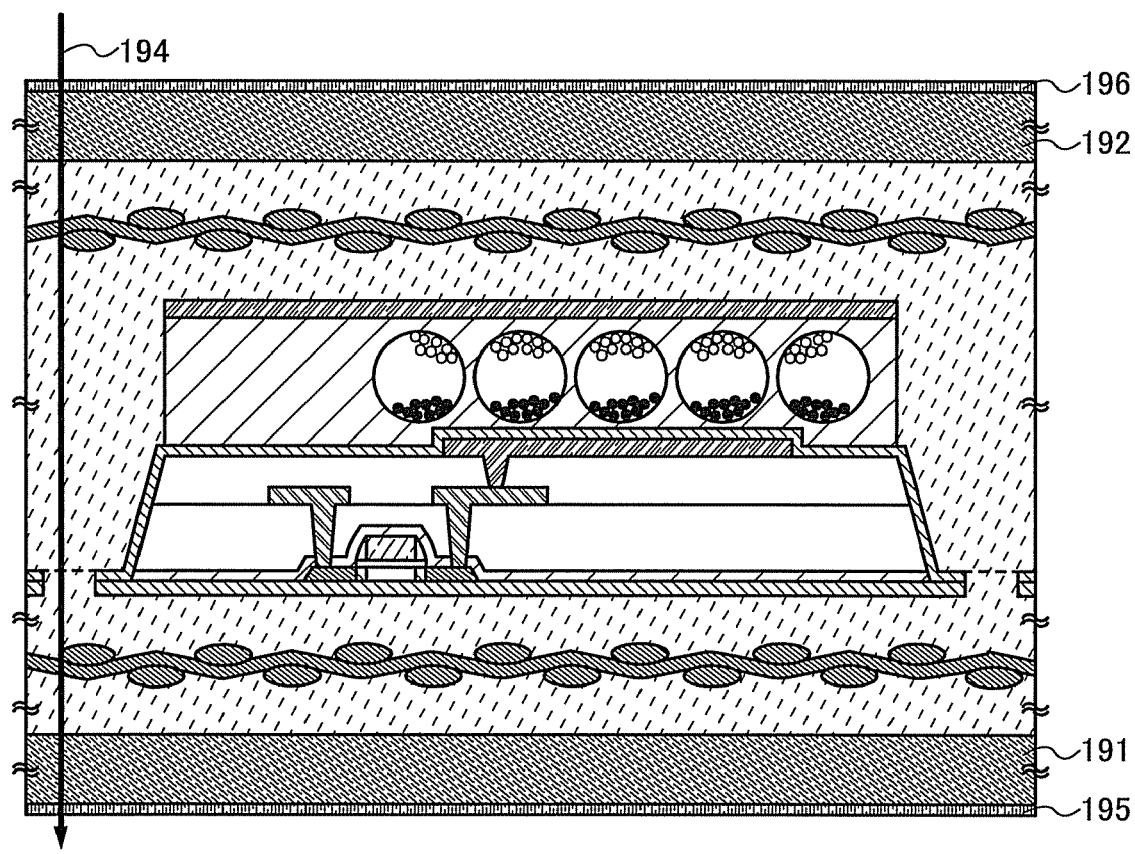

After that, the first conductive film 195 is electrically connected to the second conductive film 196. Here, a region that does not overlap the element formation layer is irradiated with laser light 194 so as to melt the first structure body 132, the second structure body 142, the first protective film 191, and the second protective film 192, whereby the first conductive film 195 is electrically connected to the second conductive film 196 (see FIG. 19B).

In the case where plural pieces of electronic paper are formed over one substrate, the edge of each electronic paper is irradiated with laser light, so that the pieces of electronic paper can be divided into separate electronic paper and the first conductive film 195 can be electrically connected to the second conductive film 196 in each electronic paper.

When the first conductive film 195 and the second conductive film 196 are electrically connected to each other to have the same potential, the effect of protection against static electricity can be obtained. Before the element formation layer is charged up with static electricity to be damaged, the electronic paper can be protected by making the top and bottom surfaces of the electronic paper have the same potential.

This embodiment can be implemented in appropriate combination with the structures or manufacturing methods shown in the other embodiments of this specification.

Embodiment 8

In this embodiment, the structure shown in the above embodiment, which is improved in adhesion between the first insulating film and the second insulating film, and a method for manufacturing the structure will be described with reference to drawings.

The electronic paper shown in this embodiment has a structure in which one of the first organic resin 132b and the second organic resin 142b has a depressed portion in a region where the first organic resin 132b and the second organic resin 142b are bonded to each other, so that the area of the bonding surface is increased.

Figure 20A:
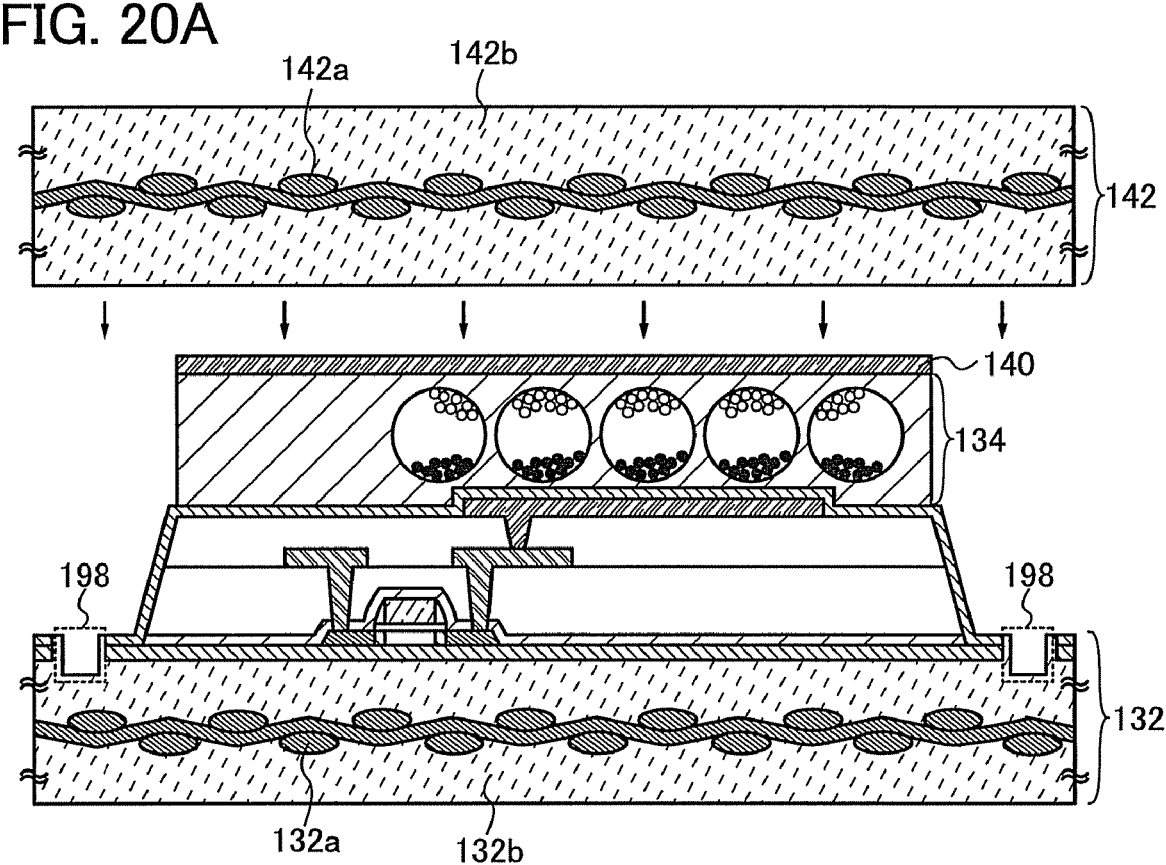
FIGS. 20A and 20B are diagrams illustrating an example of a method for manufacturing electronic paper.

Specifically, in FIG. 9A, a depressed portion 198 is formed in the first organic resin 132b of the first structure body 132 before the second structure body 142 is bonded (see FIG. 20A). The depressed portion 198 can be formed by selectively removing part of the first organic resin 132b by laser light irradiation or the like. The depressed portion 198 is formed in a region where the first organic resin 132b and the second organic resin 142b are bonded to each other.

Figure 20B:
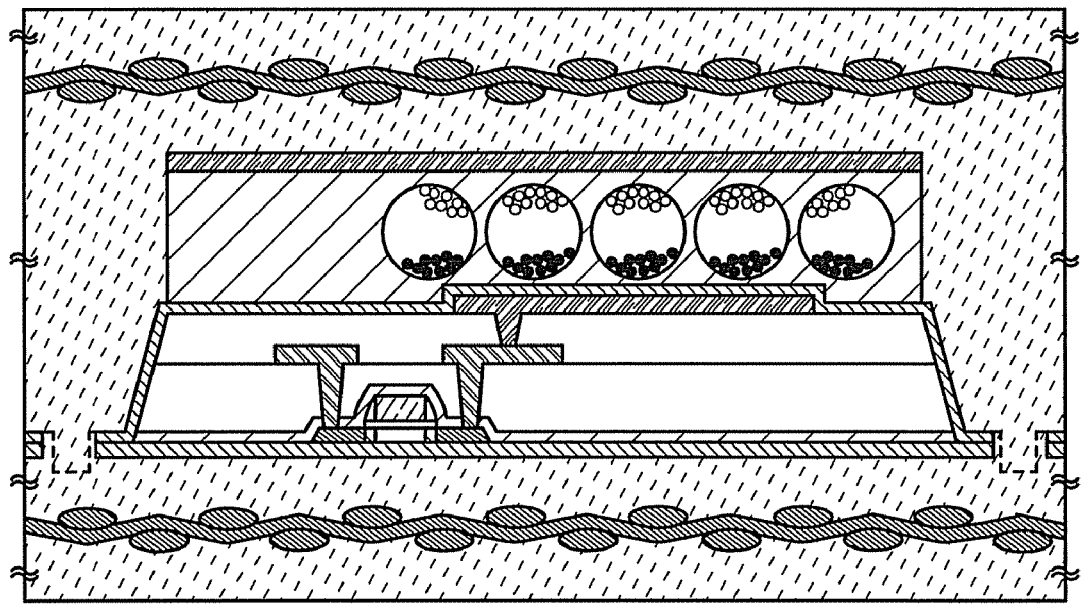

The second organic resin 142b is bonded to the first organic resin 132b after the depressed portion 198 is provided in the first organic resin 132b, so that the depressed portion 198 can be filled with the second organic resin 142b (see FIG. 20B). As a result, the area of the bonding surface of the first organic resin 132b and the second organic resin 142b can be increased and the bonding strength can be increased. Note that a plurality of depressed portions 198 may be provided.

This embodiment can be implemented in appropriate combination with the structures or manufacturing methods shown in the other embodiments of this specification.

Embodiment 9

Figure 21A:
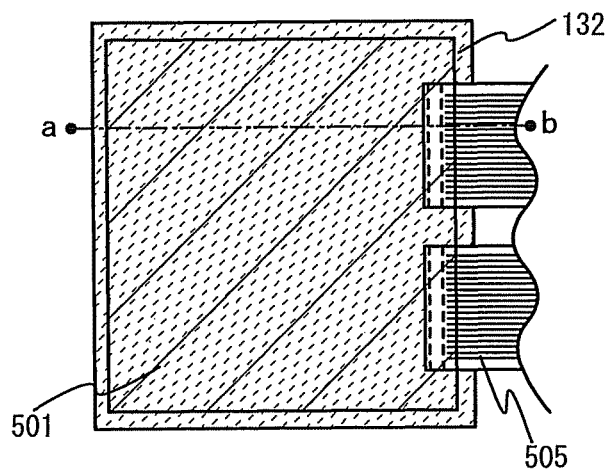
FIGS. 21A and 21B are diagrams illustrating an example of electronic paper.
Figure 21B:
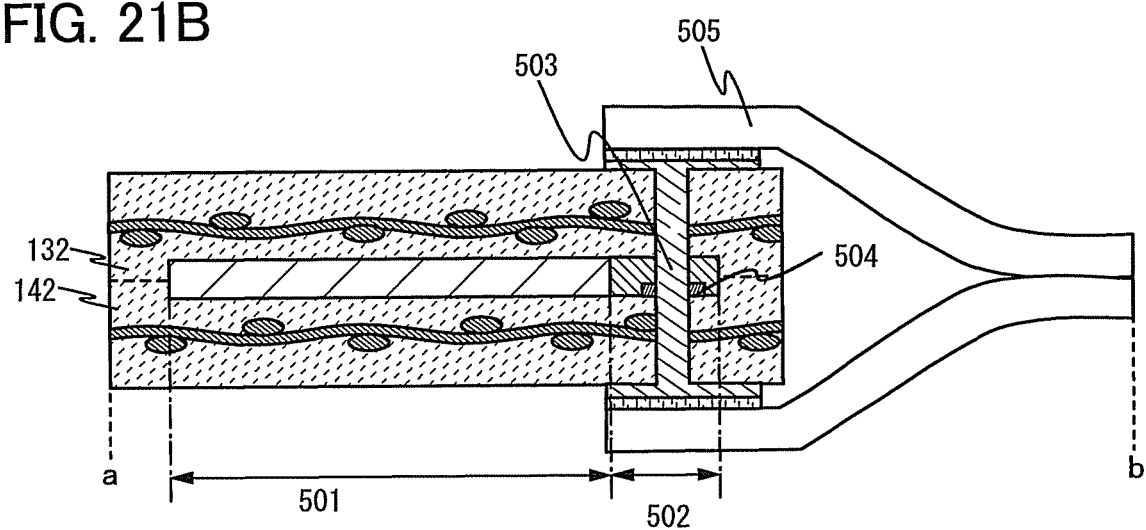

In this embodiment, module electronic paper to which an FPC is connected will be described with reference to FIGS. 21A and 21B. FIG. 21A is a top view of electronic paper that is manufactured by the method shown in the above embodiments. FIG. 21B is a cross-sectional view along line a-b of FIG. 21A.

The electronic paper illustrated in FIGS. 21A and 21B is manufactured by any of the methods shown in the above embodiments, and includes an element formation layer 501 and a terminal portion 502. The element formation layer 501 is firmly bonded to the first structure body 132 and the second structure body 142 in each of which a fibrous body is impregnated with an organic resin. The terminal portion 502 includes a wiring 504 that receives a video signal, a clock signal, a start signal, a reset signal, and the like from a flexible printed circuit (FPC) 505 serving as an external input terminal. Note that a printed wiring board (PWB) may be attached to the FPC 505 illustrated in FIGS. 21A and 21B. The electronic paper in this specification includes not only a main body of the electronic paper but also an FPC or a PWB attached to the electronic paper.

In FIG. 21B, a through wiring 503 is formed to be electrically connected to the wiring 504 provided in the terminal portion 502. The through wiring 503 can be formed in such a manner that a through hole is formed in the first structure body 132 and the second structure body 142 with a laser, a drill, an awl, or the like, and the through hole is filled with a conductive resin by screen printing, ink-jet, or the like. The conductive resin refers to a resin in which a conductive particle with a grain size of several tens of micrometers or less is dissolved or resolved in an organic resin.

As the conductive particle, for example, it is possible to use a conductive paste containing a metal element such as copper (Cu), silver (Ag), nickel (Ni), gold (Au), platinum (Pt), palladium (Pd), tantalum (Ta), molybdenum (Mo), or titanium (Ti). As the organic resin contained in the conductive resin, at least one of organic resins that function as a binder, a solvent, a dispersing agent, and a coating material of metal particles can be used. Typically, an organic resin such as an epoxy resin, a phenol resin, or a silicone resin can be used.

The through wiring 503 may be formed without forming the through hole in the first structure body 132 and the second structure body 142. For example, the through wiring 503 can be formed in such a manner that a conductive resin is placed in a predetermined position on the first structure body 132 or the second structure body 142; part of each of the organic resin in the first structure body 132 and the second structure body 142 is dissolved by reacting with an organic resin contained in the conductive resin; and metal particles contained in the conductive resin are infiltrated into the first structure body 132 and the second structure body 142.

The FPC 505 serving as an external input terminal is attached on the through wiring 503 formed in the first structure body 132 and the second structure body 142. Thus, the wiring 504 provided in the terminal portion 502 is electrically connected to the wiring 504 provided in the FPC 505 with the conductive particles contained in the through wiring 503.

This embodiment can be implemented in appropriate combination with the structures or manufacturing methods shown in the other embodiments of this specification.

Embodiment 10

The electronic paper shown in the above embodiments can be applied to electronic apparatuses of various fields, which display information. For example, the electronic paper shown in the above embodiments can be applied to e-book readers (electronic books), posters, advertisements on vehicles such as trains, or displays on various cards such as credit cards. Examples of the application of the electronic paper will be described below with reference to FIGS. 22A and 22B.

Figure 22A:
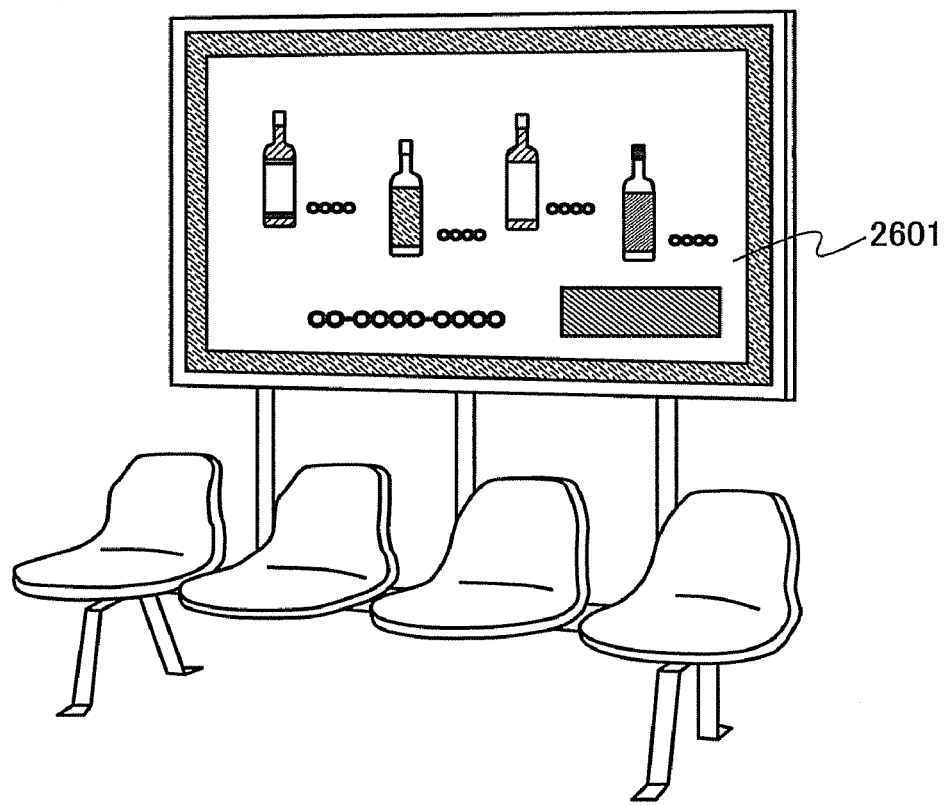
FIGS. 22A and 22B are views each illustrating an example of the application of electronic paper.

FIG. 22A illustrates a poster 2601 using electronic paper. If an advertisement is printed on paper, the advertisement is changed by hand. However, if using the electronic paper shown in the above embodiments, display of the advertisement can be changed in a short time. In addition, stable images can be obtained without display defects. Note that the poster may have a configuration capable of wirelessly transmitting and receiving data.

Figure 22B:
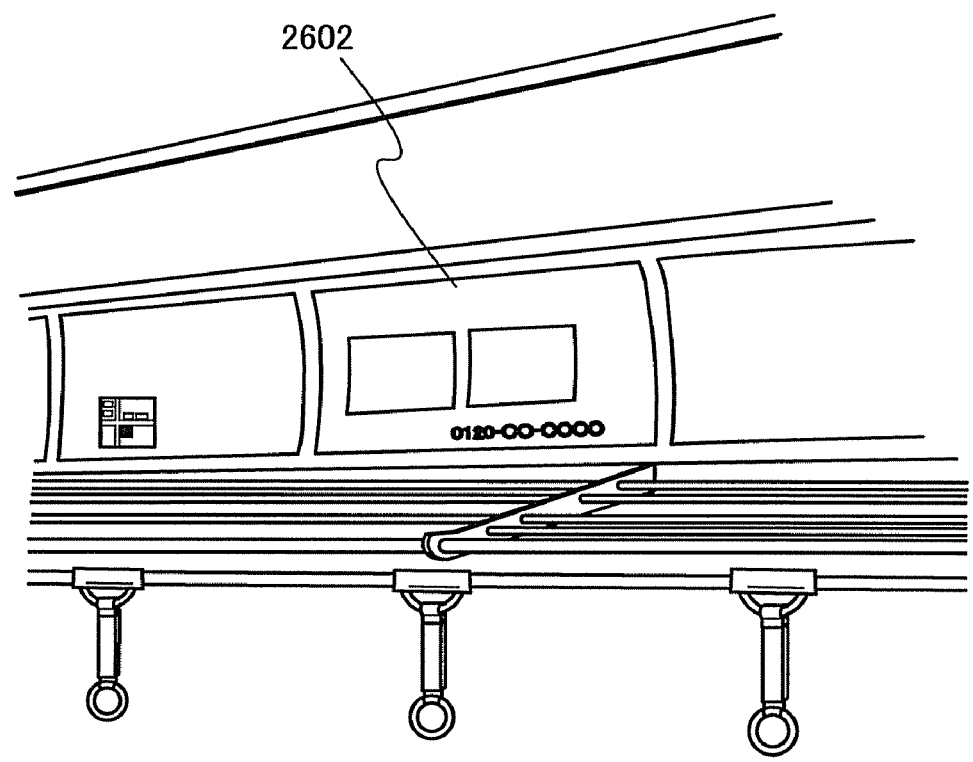

FIG. 22B illustrates an advertisement 2602 on a vehicle such as a train. If an advertisement is printed on paper, the advertisement is changed by hand. However, if using the electronic paper shown in the above embodiments, display of the advertisement can be changed in a short time with less manpower. In addition, stable images can be obtained without display defects. Note that the advertisement may have a configuration capable of wirelessly transmitting and receiving data.

This application is based on Japanese Patent Application Ser. No. 2008-180762 filed with Japan Patent Office on Jul. 10, 2008, the entire contents of which are hereby incorporated by reference.

What is claimed is:

1. An electronic paper comprising:
   a first insulating film and a second insulating film facing each other; and
   an element formation layer provided between the first insulating film and the second insulating film,
   wherein the element formation layer comprises an integrated circuit portion, a first electrode electrically connected to the integrated circuit portion, a second electrode facing the first electrode, and a charged particle-containing layer provided between the first electrode and the second electrode;

the first insulating film comprises a first structure body in which a first fibrous body is impregnated with a first organic resin;

the second insulating film comprises a second structure body in which a second fibrous body is impregnated with a second organic resin; and the first organic resin and the second organic resin are bonded to each other at edges of the first insulating film and the second insulating film.

2. The electronic paper according to claim 1,
wherein a conductive film is provided on at least one of a surface of the first insulating film and a surface of the second insulating film.

3. The electronic paper according to claim 1,
wherein a first conductive film is provided on a surface of the first insulating film and a second conductive film is provided on a surface of the second insulating film; and
the first conductive film and the second conductive film are electrically connected to each other.

4. The electronic paper according to claim 1,
wherein the first insulating film and the second insulating film are symmetrically disposed with respect to the element formation layer.

5. The electronic paper according to claim 1,
wherein a barrier layers is provided between the integrated circuit portion and the first insulating film, and between the integrated circuit portion and the second insulating film.

6. The electronic paper according to claim 1,
wherein a depressed portion is provided in the first organic resin or the second organic resin in a region where the first organic resin and the second organic resin are bonded to each other.

7. The electronic paper according to claim 1,
wherein each of the first organic resin and the second organic resin is a thermosetting resin or a thermoplastic resin.

8. The electronic paper according to claim 1,
wherein each of the first fibrous body and the second fibrous body is a polyvinyl alcohol fiber, a polyester fiber, a polyamide fiber, a polyethylene fiber, an aramid fiber, a polyparaphenylene benzobisoxazole fiber, a glass fiber, or a carbon fiber.

9. The electronic paper according to claim 1,
wherein each of a first protective film and a second protective film comprises any one of an aramid resin, a polyethylene terephthalate resin, a polyethylene naphthalate resin, a polyethersulfone resin, a polyphenylene sulfide resin, and a polyimide resin.

10. The electronic paper according to claim 1,
wherein the integrated circuit portion comprises any one of a thin film transistor, a non-volatile memory element, and a diode.

11. An electronic paper comprising:
a first insulating film and a second insulating film facing each other; and
an element formation layer provided between the first insulating film and the second insulating film,
wherein the element formation layer comprises an integrated circuit portion, a first electrode electrically connected to the integrated circuit portion, a second electrode facing the first electrode, and a charged particle-containing layer provided between the first electrode and the second electrode;

the first insulating film comprises a first structure body in which a first fibrous body is impregnated with a first organic resin, and a first protective film having a modulus of elasticity lower than that of the first structure body;

the second insulating film comprises a second structure body in which a second fibrous body is impregnated with a second organic resin, and a second protective film having a modulus of elasticity lower than that of the second structure body; and the first organic resin and the second organic resin are bonded to each other at edges of the first insulating film and the second insulating film.

12. The electronic paper according to claim 11,
wherein a conductive film is provided on at least one of a surface of the first insulating film and a surface of the second insulating film.

13. The electronic paper according to claim 11,
wherein a first conductive film is provided on a surface of the first insulating film and a second conductive film is provided on a surface of the second insulating film and
the first conductive film and the second conductive film are electrically connected to each other.

14. The electronic paper according to claim 11,
wherein the first insulating film and the second insulating film are symmetrically disposed with respect to the element formation layer.

15. The electronic paper according to claim 11,
wherein a barrier layers is provided between the integrated circuit portion and the first insulating film, and between the integrated circuit portion and the second insulating film.

16. The electronic paper according to claim 11,
wherein a depressed portion is provided in the first organic resin or the second organic resin in a region where the organic resin and the second organic resin are bonded to each other.

17. The electronic paper according to claim 11,
wherein each of the first organic resin and the second organic resin is a thermosetting resin or a thermoplastic resin.

18. The electronic paper according to claim 11,
wherein each of the first fibrous body and the second fibrous body is a polyvinyl alcohol fiber, a polyester fiber, a polyamide fiber, a polyethylene fiber, an aramid fiber, a polyparaphenylene benzobisoxazole fiber, a glass fiber, or a carbon fiber.

19. The electronic paper according to claim 11,
wherein each of a first protective film and a second protective film comprises any one of an aramid resin, a polyethylene terephthalate resin, a polyethylene naphthalate resin, a polyethersulfone resin, a polyphenylene sulfide resin, and a polyimide resin.

20. The electronic paper according to claim 11,
wherein the integrated circuit portion comprises any one of a thin film transistor, a non-volatile memory element, and a diode.

21. A display device comprising:
a first insulating film comprising a fibrous body and an organic resin wherein the fibrous body is impregnated with the organic resin;
an element formation layer over the first insulating film, the element formation layer including:
a second insulating film on the first insulating film;
a thin film transistor over the second insulating film;
an interlayer insulating layer over the thin film transistor;

a first electrode over the interlayer insulating film and electrically connected to the thin film transistor;
a charged particle-containing layer over the first electrode;
a second electrode over the charged particle containing layer; and
a third insulating film over the second electrode, the third insulating film comprising the fibrous body and the organic resin wherein the fibrous body is impregnated with the organic resin,
wherein the first insulating film is in contact with the second insulating film in a portion around the element formation layer.

22. The display device according to claim 21,
wherein the thin film transistor is a top gate type.

23. The display device according to claim 21,
wherein the thin film transistor is a bottom gate type.

24. The display device according to claim 21,
wherein the charged particle-containing layer is a microcapsule electrophoresis system.

25. A display device comprising:
a first insulating film comprising a fibrous body and an organic resin wherein the fibrous body is impregnated with the organic resin;
an element formation layer over the first insulating film, the element formation layer including:
  a second insulating film on the first insulating film;
  a thin film transistor over the second insulating film;
  an interlayer insulating layer over the thin film transistor;
  a first electrode over the interlayer insulating film and electrically connected to the thin film transistor;
  a third insulating film over the first electrode and the interlayer insulating film wherein the third insulating film is in contact with side surfaces of the interlayer insulating film and an upper surface of the second insulating film;
  a charged particle-containing layer over the first electrode;
  a second electrode over the charged particle containing layer; and
  a fourth insulating film over the second electrode, the third insulating film comprising the fibrous body and the organic resin wherein the fibrous body is impregnated with the organic resin,
wherein the first insulating film is in contact with the second insulating film in a portion around the element formation layer.

26. The display device according to claim 25,
wherein the thin film transistor is a top gate type.

27. The display device according to claim 25,
wherein the thin film transistor is a bottom gate type.

28. The display device according to claim 25,
wherein the charged particle-containing layer is a microcapsule electrophoresis system.

* * * * *